United States Patent [19]
Litchford

[11] 3,875,570
[45] Apr. 1, 1975

[54] ADAPTIVE PROXIMITY INDICATING SYSTEM

[75] Inventor: George B. Litchford, Northport, N.Y.

[73] Assignee: Litchstreet Co., Northport, N.Y.

[22] Filed: Mar. 27, 1973

[21] Appl. No.: 345,432

[52] U.S. Cl. .................... 343/6.5 LC, 343/112 CA
[51] Int. Cl. ............................................. G01s 9/56
[58] Field of Search ...... 343/6.5 R, 6.5 LC, 112 CA

[56] References Cited
UNITED STATES PATENTS

| | | | |
|---|---|---|---|
| 3,550,129 | 12/1970 | Steele | 343/112 CA |
| 3,566,404 | 2/1971 | Sorkin | 343/112 CA X |
| 3,626,411 | 12/1971 | Litchford | 343/6.5 R X |
| 3,691,559 | 9/1972 | Jackson | 343/112 CA X |
| 3,735,408 | 5/1973 | Litchford | 343/112 CA |
| 3,757,324 | 9/1973 | Litchford | 343/6.5 R |

*Primary Examiner*—T. H. Tubbesing
*Attorney, Agent, or Firm*—Brumbaugh, Graves, Donohue & Raymond

[57] ABSTRACT

An adaptive proximity indication system using the signals emitted by the hundreds of existing secondary radar ground stations and the nearly 100,000 cooperating transponders on mobile vehicles to detect intrusion in a monitored proximity volume. The system automatically adapts to a given SSR environment to vary the size and shape of the monitored volume and to control its method of proximity measurements.

46 Claims, 30 Drawing Figures

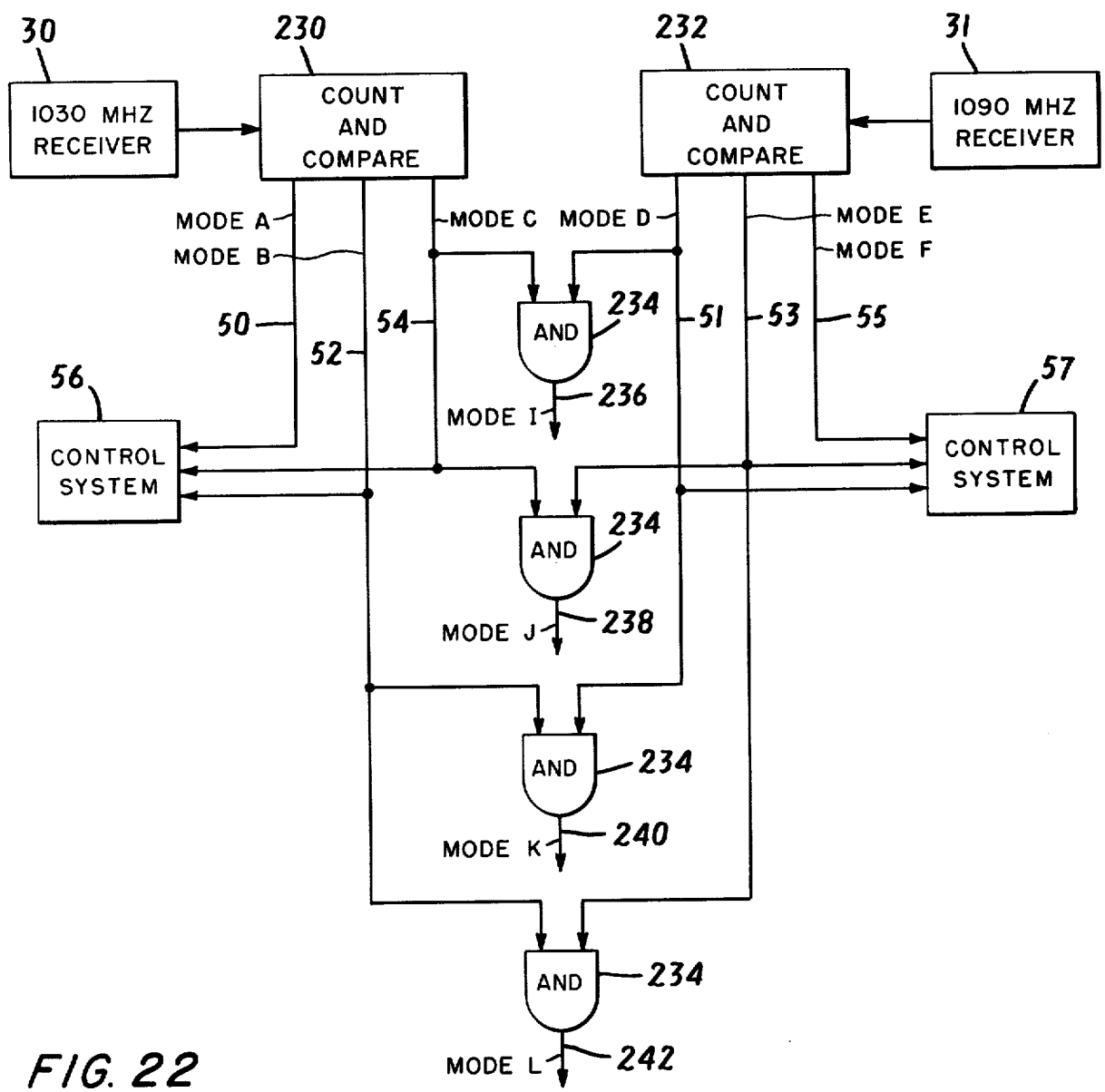
FIG. 22
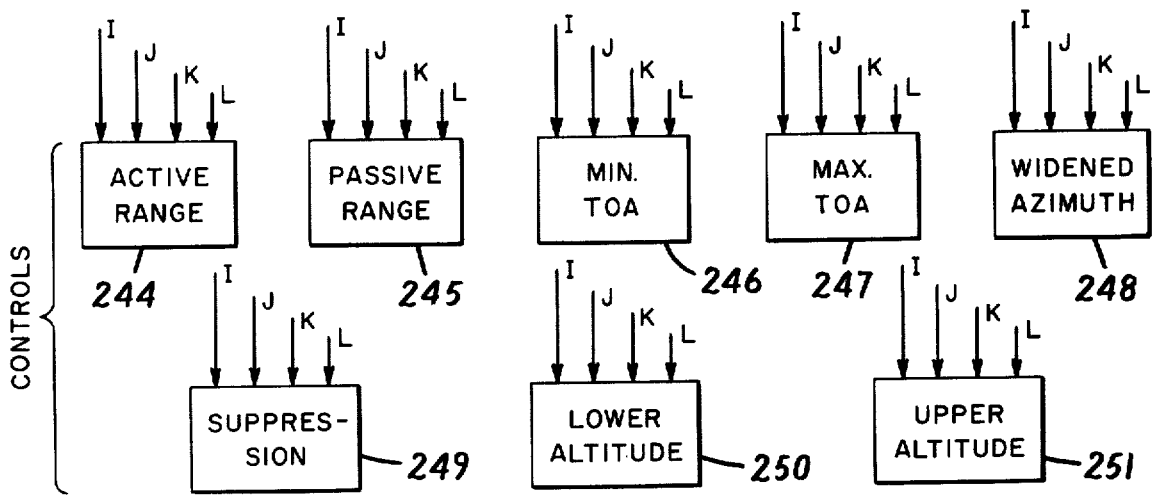

3,875,570

ADAPTIVE PROXIMITY INDICATING SYSTEM

CROSS-REFERENCE TO RELATED PATENTS AND APPLICATIONS

This application is related to the following United States patents and patent applications:

1. U.S. Pat. No. 3,626,411 of George B. Litchford, issued Dec. 7, 1971.
2. U.S. Pat. application Ser. No. 130,952 of George B. Litchford, filed Apr. 5, 1971, now Pat. No. 3,735,408
3. U.S. patent application Ser. No. 180,578 of George B. Litchford, filed Sept. 15, 1971 now Pat. No. 3,757,324
4. U.S. patent application Ser. No. 317,810 of George B. Litchford, filed Dec. 22, 1972.

BACKGROUND OF THE INVENTION

The present invention pertains to an adaptive proximity indicating system for use with mobile vehicles within the coverage of the scanning radar beams of a secondary surveilance radar (SSR) system.

This adaptive system will also provide certain proximity measurements in the absence of interrogations from a ground radar (SSR) environment.

More particularly, the invention concerns an adaptive proximity indicating system, capable of determining the proximity of mobile vehicles, that is based on secondary radar such as the National Air Traffic Control Radar Beacon System (ATCRBS) and the International Civil Aviation Organization (ICAO) Secondary Surveillance Radar System. The U.S. National Aviation Standard for the ATCRBS is described in the Federal Aviation Administration Advisory Circular No. 00–27 dated Oct. 10, 1968.

Major airports and way points are presently equipped with secondary surveillance radar (SSR) adapted to cooperate with transponders carried on aircraft to discriminate against interference and ground clutter and to provide for transmission of identification and other data, such as altitude, from the aircraft to the ground-based radar. A traffic controller observing the radar display directs the pilots of the involved aircraft by radio, usually with voice communication, so as to maintain or restore safe separations between aircraft. Such a system is limited in capability because each aircraft must be dealt with individually and requires its share of the controller's time and attention and its share of the available radio spectrum. When traffic is heavy, take-offs and landings are delayed, and the possibility of collision increases.

The number of mid-air collisions and near misses has become so large in recent times that numerous inter-aircraft cooperative proximity warning systems have been proposed. Those more prominently under study or development at this time involve frequent or quasi-continuous exchange of signals between all cooperative aircraft within the region of interest and make no provision for non-cooperating aircraft. The required airborne equipment would be bulky and expensive, use more of the already crowded radio spectrum and would be generally independent of other needed and existing equipment, such as transponders. Anothter drawback of some of the proposed systems is that they provide only relative positional information, without ground reference, but in effect with respect to a randomly floating reference.

At least some of the disadvantages of these proposed systems may be overcome by providing aircraft with a proximity indicating system based on the already existing secondary surveillance radar system. Particularly if the presence and degree of threat of any nearby aircraft in the proximity of one's own aircraft can be measured entirely passively — i.e., by merely "listening" to the transponder replies of nearby aircraft to interrogations of radar ground stations — it is possible to provide an effective warning in time to avoid collisions without major outlay for an entirely new system and without utilizing an additional portion of the radio spectrum. In addition, the passive measurement of the presence of a possible threat within a given volume of airspace allows direct solicitation of range between vehicles carrying the proximity measurement system. This avoids unnecessary solicitation of other aircraft and avoids replies to range solicitations from others outside the volume restrictions. This modifies the proximity measurement to accommodate this active mode only between the two concerned proximity aircraft excluding all others.

A proximity indicating system of the above-described type has been proposed and is disclosed in the U.S. patents and patent applications referred to above. In practice, an aircraft which is equipped and protected with such a system may fly throughout the world so that the line- of-sight coverage to interrogating SSR ground stations may vary; i.e., the number of stations received at any given time, may vary from no stations at all to several tens of stations. Similarly, the air reply signal environment may vary from no replies to a very crowded reply signal environment. It is therefore difficult to design a proximity indicating system which operates optimally in such extremes of the interrogation and reply signal environments, without some form of a change in its mode of proximity measurement that is in consonance with the changing environments.

SUMMARY OF THE INVENTION

It is therefore an object of the present invention to provide a proximity indicating system which can automatically adapt to a changing SSR system environment.

This object, as well as other objects which will become apparent in the discussion that follows, is achieved, according to the present invention, by measuring the environment and then adjusting the proximity measuring and indicating system to that given environment so that the system performance, and therefore safety, are optimized.

In a first embodiment of the present invention means are provided for measuring the interrogation rate together with means for modifying the mode of operation of the proximity indicating system in dependence upon this rate. As used herein, the term "interrogation rate" is intended to denote the number of valid interrogations received from SSR ground stations per unit of time.

In a second embodiment of the present invention means are provided for measuring the reply rate together with means for modifying the mode of operation of the proximity indicating system in dependence upon this rate. As used herein, the term "reply rate" is intended to denote the number of valid reply messages received from the transponders of other aircraft per unit of time.

Measurement of the number of interrogations received over a specific time interval establishes this rate and modifies the proximity measurement and indicating system accordingly. Similarly, measurement of reply messages over a given length of time (shorter or longer than for interrogations) may also modify the mode of proximity measurements. These two measurements of interrogation and reply signal rates may operate separately or in combination to control the means for changing the mode of operation.

In a third embodiment of the present invention means are provided for measuring the current altitude of the proximity indicating system-equipped aircraft together with means for modifying the mode of operation of the indicating system in dependence upon this altitude. This third embodiment of the invention may work in combination with the first and second embodiments to simultaneously modify the operation of the proximity measurement and indicating system by sensing altitude and signal densities and adjusting the mode of operation in accordance with the sensed environment.

In a fourth embodiment of the present invention means are provided for receiving and decoding side lobe suppression signals transmitted by SSR ground stations together with means for modifying the mode of operation of the proximity measurement and indicating system in dependence upon the presence or absence of these signals.

In a fifth embodiment of the present invention there are provided means for measuring the time of arrival (TOA) of each reply signal of a given transponder relative to the timing of the interrogation signal by which it is initiated; means for determining the number of TOA's measured per unit of time; and means for modifying the mode of operation of the proximity measurement and indicating system in dependence upon this number. This fifth embodiment may function in conjunction with the first embodiment, for example, to limit the maximum value of the TOA measured or to selectively measure TOA values from a given radar.

The term "time of arrival" or "TOA," as used herein, is intended to denote the time interval between a valid interrogation and a valid reply to that interrogation from the transponder of another aircraft, as measured at the "Own" aircraft — that is, the aircraft equipped with the proximity measurement and indicating system according to the present invention.

In any of the embodiments of the invention the mode of operation of the proximity measurement and indicating system may be controlled to optimize the response of the system relative to the environment. For example, either the minimum and maximum TOA gates or the upper and lower altitude gates, or both, may be adjusted to vary the size of the monitored region of space. If desired, the transmission of a reply may be suppressed to permit the minimum TOA gate to overlap a reply period. Within a widened azimuthal gate, one's own transponder is not emitting signals during the listening interval, thus allowing the minimum TOA gate to be made small. This gate may also be adjusted automatically in the azimutal region adjacent to the proximity transponder replying inside the nearby beam.

In addition, the selected azimuth listening sector of an SSR main beam may be widened or narrowed to vary the size of the monitored volume of space that is free of one's own transponder transmissions on the reply frequency. In a signal environment absent nearly all interrogations, the range of nearby aircraft may be obtained actively by the low-power omnidirectional transmission of interrogations. Such air-to-air interrogation may be on either the reply channel (1090 MHz) or the interrogation channel (1030 MHz) depending upon the sensing of the actual environment. Absent all ground interrogations the 1030 MHz channel may be used. The presence of many interrogations and replies requires the use of 1090 MHz interrogations (air-to-air) employing the proximity gated volumes of the threatening aircraft or its indentity/altitude relationship to prevent undesired interrogations of non-threatening aircraft as well as undesired slant range replies. In addition, in a single environment having many interrogations, some interrogations signals may be filtered out by tuning to the pulse repetition frequency (PRF) of only selected SSR ground stations.

BRIEF DESCRIPTIONS OF THE DRAWINGS.

FIG. 22 is a block diagram of another preferred embodiment of the present invention.

DESCRIPTION OF THE PREFERRED EMBODIMENTS

The preferred embodiments of the present invention will now be described in connection with FIGS. 1-30 of the drawings.

All commercial transport aircraft and nearly all other aircraft that utilize major airports are equipped with transponders which reply to interrogations received from SSR ground stations. As each SSR beam sweeps past an aircraft, it interrogates that aircraft transponder at a frequency of 1030 MHz, and each interrogation initiates a reply transmission from the transponder at a frequency of 1090 MHz. Typically an interrogating beamwidth upon sweeping by the aircraft solicits about 18 reply messages in response to its unique period of consecutive interrogations. At all angles outside the interrogation beamwidth, side lobe suppression (SLS) signals are radiated by the ground station. The signal strength of these SLS signals is greater than the strength of the side lobes of the main beam.

Figure 1:
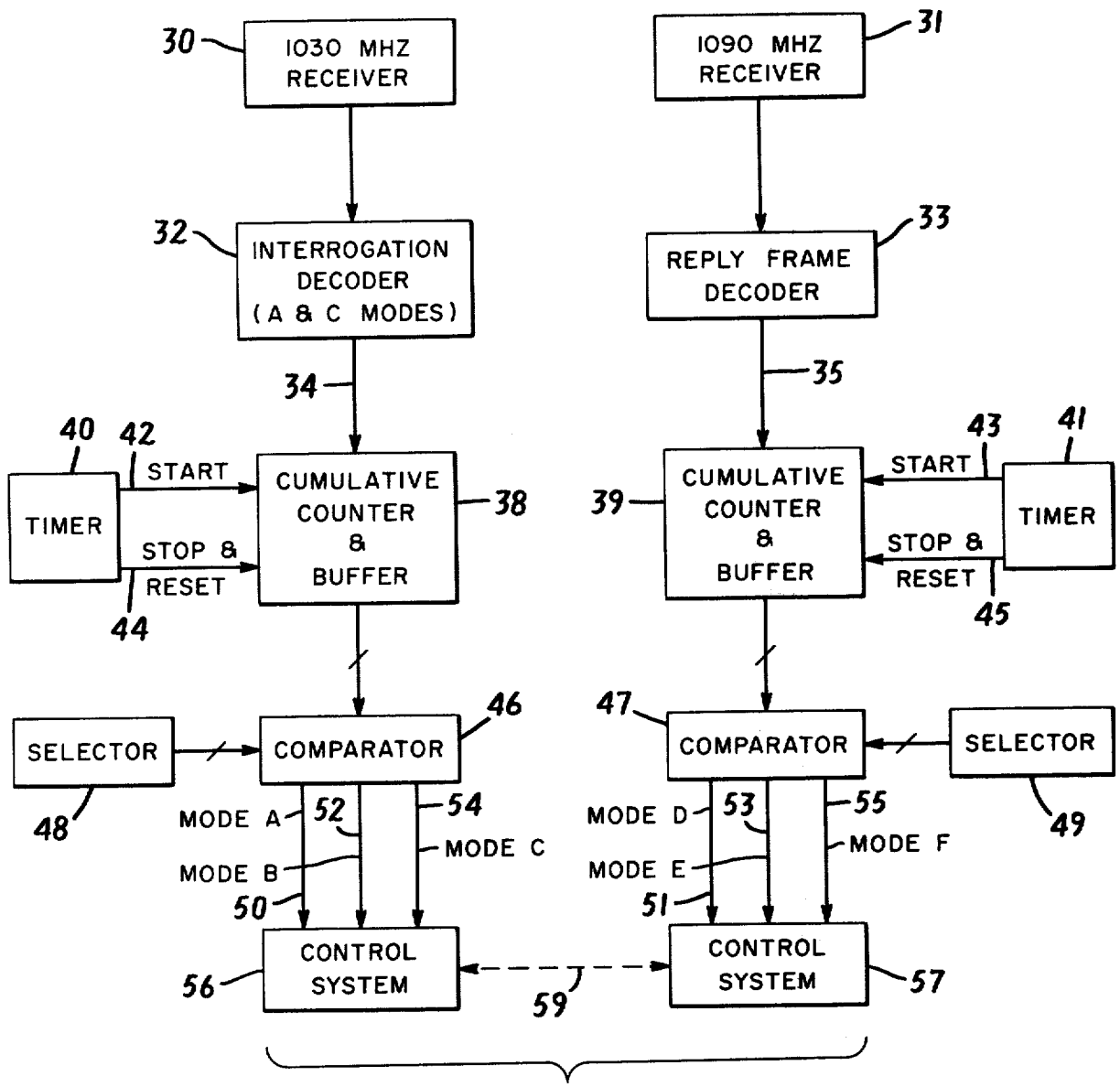
FIG. 1 is a block diagram of two preferred embodiments of the present invention.

FIG. 1 illustrates one embodiment of apparatus, according to the present invention, for adaptively modifying the operation of proximity indicating system in response to either the number of interrogations or the number of replies received in a given period of time, or both. This apparatus is designed to be compatible with existing transponders and may be carried on an aircraft or located wherever it is useful to adaptively modify the operation of a proximity indicating system to the interrogation environment or to the reply environment.

Figure 14:
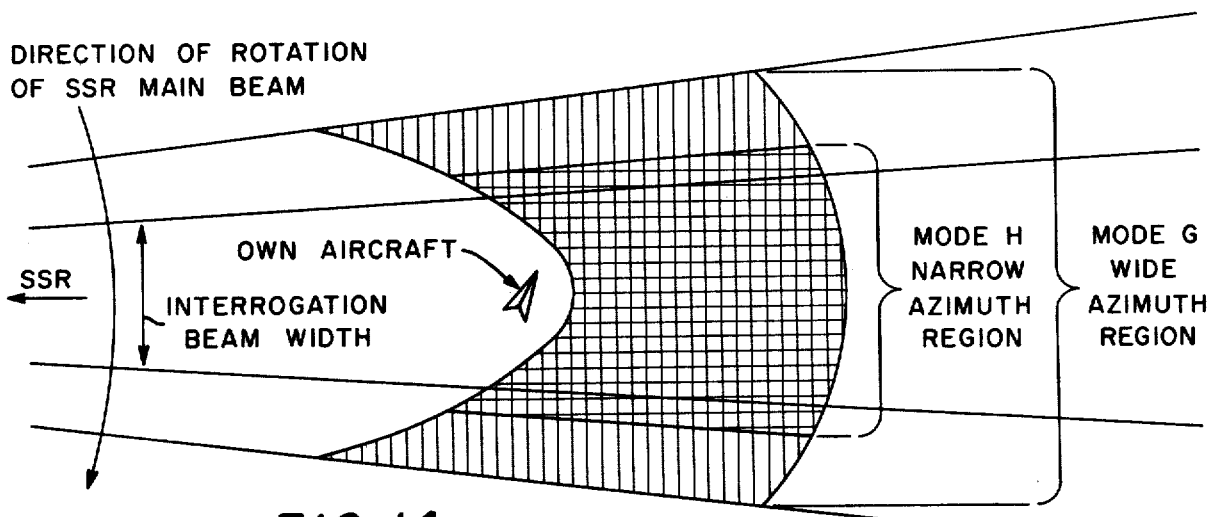
FIG. 14 is a geometrical diagram showing a secondary surveillance radar beam and one aircraft equipped with the system of FIG. 13, and showing the "listen-in" regions monitored with the system of FIG. 13.

The apparatus of FIG. 1 comprises a conventional 1030 MHz receiver 30 of the type included within a standard transponder carried on board an aircraft. Also provided is an interrogation decoder 32 which produces an output pulse upon receipt of both P1 and P3 pulses spaced apart in time either 8 microseconds (A mode) or 21 microseconds (C mode). The apparatus of FIG. 1 further includes a 1090 MHz receiver 31 to receive the reply signals transmitted by other transponder equipped aircraft and a reply frame decoder 33 which produces an output pulse upon receipt of the F1 and F2 framing pulses, spaced 20.3 microseconds apart. The A and C mode standard for interrogation pulses as well as the F1-F2 pulse standard for transponder replies is shown in FIG. 14 of my copending application Ser. No. 317,810, filed Dec. 22, 1972, and referred to above.

The apparatus of FIG. 1 also comprises two divices 38 and 39, both of which are designated in the figure as a "cumulative counter and buffer." The structure of this counter and buffer will be described in detail below in connection with FIG. 2. Suffice it to say at this point that these devices count and store the number of pulses received at their respective input lines 34 and 35, during given periods of time which are determined by separate timers 40 and 41, respectively. The counter and buffer 38 is connected to receive pulses from the interrogation decoder 32, whereas the counter and buffer 39 receives pulses from the reply frame decoder 33. The timer 40 starts the counter and buffer 38 by applying a pulse on line 42 and stops and resets this device at the termination of the counting interval by applying a pulse on line 44. Similarly, the timer 41 determines the interval of count of the counter and buffer 39 by applying start and stop pulses on lines 43 and 45, respectively.

Each time a counter and buffer 38 or 39 completes a count and is reset by its timer 40 or 41, respectively, its maximum count is stored in the buffer and is applied in parallel to a plurality of output lines. In the case of the counter and buffer 38, these lines are connected to a comparator 46 which compares the maximum interrogation count to one or more values determined by a selector 48. In the case of the counter and buffer 39, the output lines are connected to a comparator 47 which compares the maximum reply count with one or more values determined by a selector 49. Depending upon the results of the comparison, the comparator 46 will produce a signal on one of its output lines 50, 52 and 54 indicating a "mode A," "mode B" or "mode C" operation, respectively. The output signals on lines 50, 52 and 54 are then applied to a control system 56 that adapts the proximity measurement and indicating system to the interrogation environment in a manner which will be further explained below. Similarly, the comparator 47 will produce a signal on one of its output lines 51, 53 and 55 indicating "mode D," "mode E" or "mode F" operation, respectively. The signals on the lines 51, 53 and 55 are applied to a control system 57 to adapt the proximity measurement and the indicating system to the transponder reply environment.

The control systems 56 and 57 may be separately connected to the proximity measurement and indicating system so that one control system can modify the operation of the proximity measurement and indicating system independently of the other control system. If desired, the two control systems can also be interconnected as indicated by the dashed line 59 so that the operation of one control system will depend upon the operation of the other. An example of such interconnection will be described below in connection with FIG. 22.

In the operation of the apparatus of FIG. 1, the interrogation decoder 32 produces a pulse in response to each 1030 MHz interrogation received by the receiver 30. Similarly, the reply frame decoder 33 produces a pulse in response to each 1090 MHz reply received by the receiver 31. These pulses are passed by the lines 34 and 35, respectively, to the separate counter and buffer devices 38 and 39. By counting the number of pulses received for a selected period of time - determined separately for each counter by the timers 40 and 41 the device 38 will store in its buffer a number designated herein as the "interrogation rate" while the device 39 will store in its buffer a number designated herein as the "reply."

Typically, an airport SSR radar beam makes one full revolution every 4 seconds while enroute radars rotate once every 10 seconds. Both beams interrogate mobile transponders approximately 18 to 30 times during each beam passage of these transponders. Thus, if 1030 MHz interrogations are monitored for a given period of time, say 10 seconds, it is possible to determine approximately the number of beams which traverse the position of the 1030 MHz receiver 30.

Similarly, the 1090 MHz reply rate is usually directly related to the number of SSR ground stations within line of sight multiplied by the number of transponders replying in the vicinity of the 1090 MHz receiver 31. A high count accumulated by the counter and buffer 39 during the period set by the timer 41 is indicative of a dense air traffic environment whereas a low count is indicative of a low air traffic density.

Thus, if the timer 41 as wlll as the timer 40 were set for a period of 10 seconds (although these two timers are not necessarily or even normally set to the same period) the count stored in the buffer of the device 39 would be approximately equal to the count stored in the buffer of the device 38 multiplied by the number of aircraft in the vicinity. Principally because all the aircraft in the vicinity are not within line of sight of the same number of ground interrogators as is the own aircraft carrying the equipment of FIG. 1, the ratio of the counts in the devices 39 and 38 is not an exact measure of the air traffic density.

As described above, the accumulated counts stored in the buffers of the devices 38 and 39 are applied to the separate comparators 46 and 47, respectively. Each comparator compares the count applied thereto to one or more fixed values either automatically or manually determined by selectors 48 and 49, respectively, and produces a signal on one of a plurality of output lines indicating a particular mode of operation. For example, if the number of counts stored in the buffer of the device 38 is less than a first value prescribed by the selector 48, a signal is produced on the output line 50 indicating mode A operation. However, if the number of counts exceeds this first value but is less than a second value prescribed by the selector 48, a signal is produced on the output line 52 indicating mode B operation. Finally, if the number of counts exceeds this second value prescribed by the selector 48, an output signal is produced on line 54 indicating mode C operation. Mode A thus indicates a low interrogation rate, mode B indicates a medium interrogation ratae and mode C indicates a high interrogation rate.

Similarly, the count stored in the buffer of the device 39 is compared by the comparator 47 to first and second values prescribed by the selector 49. If the count is less than the first or lower value, a signal is produced on line 51 indicating mode D operation. If the count is greater than the first value but less than a higher second value, a signal is produced on line 53 indicating mode E operation and if the count is higher than the second value, a signal is produced on line 55 indicating mode F operation. Mode D thus indicates a low reply rate, mode E indicates a medium reply rate and mode F indicates a high reply rate.

The selectors 48 and 49 which prescribe the values determining the divisions between the different modes of operation may constitute manually operable code wheel switches which apply a manually selected value or values in digital code to the respective comparators 46 and 47. If only one value is applied to a comparator, the comparator can categorize the environment into only two modes; i.e., high and low. If two values are aplied to the comparator, the comparator will be able to categorize the environment into three modes; i.e., low medium and high, as in the case of the exemplary apparatus of FIG. 1. By applying additional values to the comparator, the comparator will be able to categorize the environment into four, five or as many modes as desired so that the proximity measurement and indicating system may be made adaptive to small environmental changes.

Figure 2:
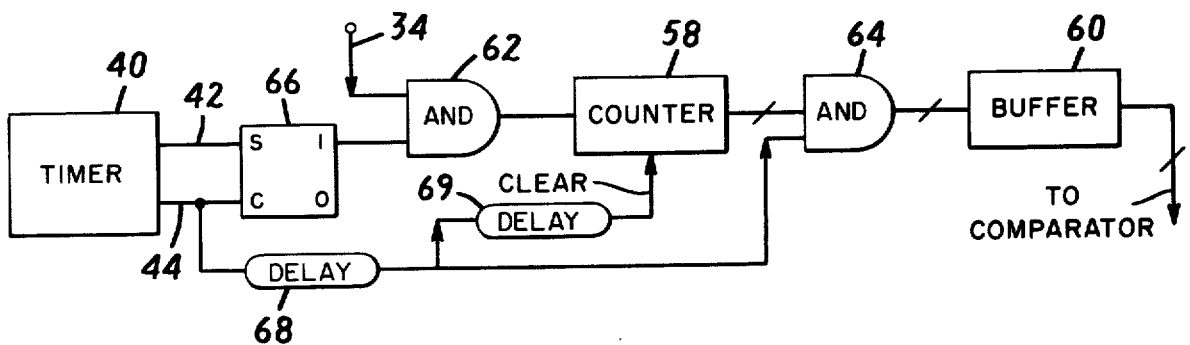
FIG. 2 is a block diagram of a cumulative counter and buffer device which may be employed with the embodiments of FIG. 1.

FIG. 2 shows one type of cumulative counter and buffer which may be used as the devices 38 and 39 in the apparatus of FIG. 1 or may be used with other embodimetns of the present invention. This cumulative counter and buffer comprises a counter 58, a buffer 60, AND gates 62 and 64, a control flip1flop 66, and delay devices 68 and 69. For illustration, the cumulative counter and buffer of FIG. 2 is connected to the timer 40 which produces a pulse on line 42 to set the flip-flop 66 and a pulse on line 44 to clear the flip-flop 66. when the flip-flop 66 is set, its 1 output terminal is energized and enables the counter 58 to count the pulses applied via line 34 to the AND gate 62. At the end of the time period set in the timer 40 the pulse produced on line 44 enables the transfer of the accumulated count in the counter 58 to the buffer 60 via the AND gate 64 and clears the counter 58. After the counter has been cleared, the timer produces a pulse on line 42 to again set the flip-flop 66 and repeats the cycle. In this manner, the buffer 60 is forced into a state representing the count most recently transferred to it and holds that state until forced into another that represents a new, updated count. The count in the buffer 60 is thus continuously available in parallel form and may be applied to a comparator as described above in connection with FIG. 1.

FIGS. 3-21, which will now be described, illustrate various control systems that may be employed with the proximity measurement and indicating system to optimize the response of the indicating system relative to the environment. Although any of the embodiments of the present invention, which sense various types of environment surrounding the aircraft equipped with the proximity measurement and indicating system, may be used as inputs, the control systems illustrated in FIGS. 3–21 will be described as being responsive to either a low (mode G) interrogation rate or high (mode H) interrogation rate.

The various control systems illustrated in FIG. 3–21 are clearly not limited to the particular case illustrated — that is, to the case in which the control systems are responsive to the interrogation rate and to only two modes of operation. It will be understood that other aspects of the environment may be sensed and/or that more than two modes of operation may be used to operate these control systems.

Figure 3:
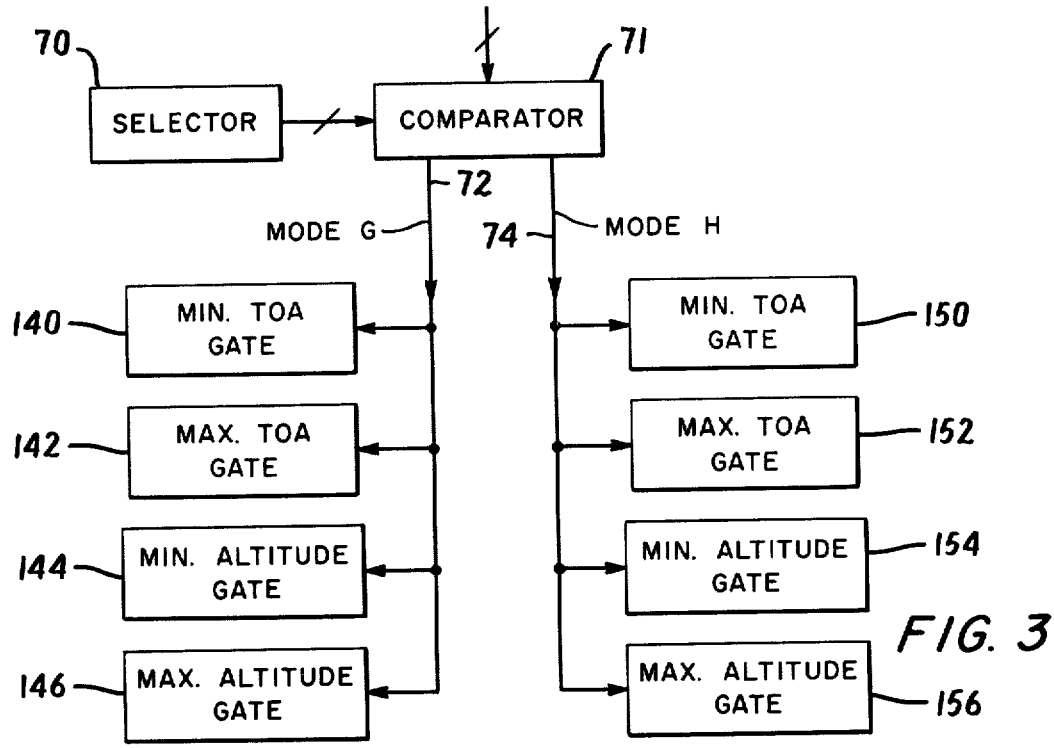
FIG. 3 is a block diagram of a control system which may be employed with any embodiment of the present invention.

Thus, for illustrative purposes only, FIG. 3 shows a comparator 71 connected to receive the interrogation rate from a counter and buffer such as the device 38 illustrated in FIG. 1. A selector 70 supplies a single value to the comparator 71 so that the interrogation rate is divided into two categories: a mode G category in which the interrogation rate lies below the value prescribed by the selector 70 and a mode H category in which the interrogation rate lies above this prescribed value. Mode G operation is indicated by a signal appearing on line 72, whereas mode H operation is indicated by a signal appearing on line 74.

Figure 4:
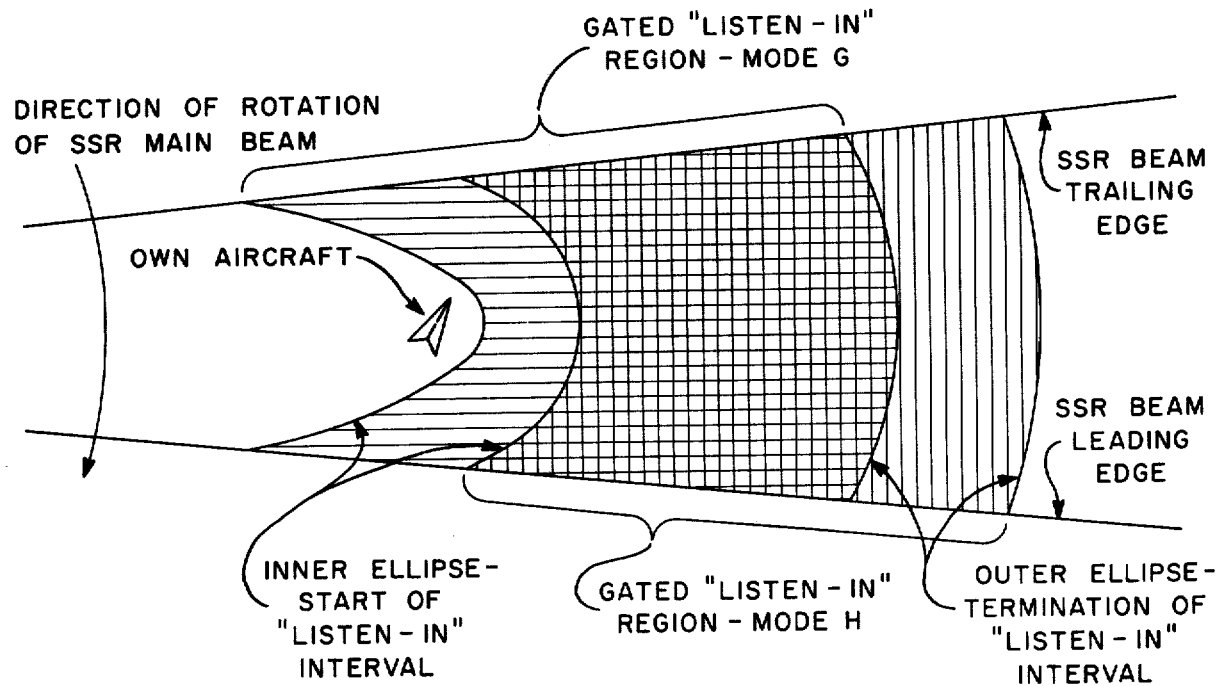
FIG. 4 is a geometrical diagram showing a secondary surveillance radar beam and the gated "listen-in" region of the present invention.

FIG. 3 shows the signals on lines 72 and 74 being used to adaptively modify the minimum and maximum time of arrival or "TOA" gates 140, 150 and 142, 152, respectively, and the lower and upper altitude gates 144, 154 and 146, 156, respectively, to vary the "listen-in" region depending on whether mode G or mode H operation is indicated. FIG. 4 of my U.S. pat. No. 3,626,411 issued on Dec. 7, 1971, shows the inner and outer "listen-in" elliptical limits that result from a minimum TOA gate interval of 30 microseconds and a maximum TOA gate interval of 130 By decreasing or increasing the minimum TOA gate interval, it is possible to move the inner ellipse closer to or farther away from the 1090 MHz receiver location and, similarly, by varying the maximum TOA gate interval it is possible to vary the distance of the outer ellipse from the 1090 MHz receiver location. Therefore, by selecting different minimum TOA and maximum TOA gate interval values it is possible to define different "listen-in" regions for mode G and mode H operation.

From the definition of "time of arrival" or "TOA" which is given above, it will be appreciated that the minimum and maximum TOA gate intervals are initiated at the time that an interrogation is received at the subject aircraft (or possibly at a time which is phased several microseconds before or after the instant that the interrogation is actually received; e.g., at the time an "F₁" pulse is produced by the transponder of the subject aircraft). In cases where the subject aircraft is not being interrogated, but where it is listening outside of the SSR main beam, the minimum and maximum TOA gate intervals are initiated at the time (or at an instant slightly before or after the time) that a side lobe suppression (SLS) signal is received (or would be received if the subject aircraft had a receiver of sufficient sensitivity); that is, at the time that an interrogation would be received if the main beam were directed toward the subject aircraft. Since the wavefront of this SLS signal and/or the interrogation defines an arc of a circle as it is propagating away from the transmitting SSR ground station at radio velocity, the instant at which the TOA gate intervals are initiated is determined by the time that this ever-expanding circle reaches the subject aircraft.

To state it another way, the minimum and maximum TOA gate intervals are initiated at an instant determined by the time that the wavefront of an interrogation moving at radio velocity passes through an arc having a radius extending from the SSR station transmitting that interrogation to the position of the subject aircraft.

FIG. 4 is a graphical representation of the way in which the "listen-in" region may be modified in the horizontal plane by varying the inner and outer TOA gate intervals using the control system of FIG. 3. Since, in the example given, mode G operation represents the situation in which the interrogation rate is low, it is desirable that the TOA gates activated by a signal on the mode G line 72 enable the proximity indicating system to "listen-in" over a larger region than the region enabled by a signal on the mode H line 74. Suitable values for mode G operation might be, for example, 1.5 microseconds for the minimum TOA gate and 70 microseconds for the maximum TOA gate. When mode H operating conditions are indicated, suitable values might be 3 microseconds for the minimum TOA gate and 40 microseconds for the maximum TOA gate. Another example of mode H operation might be 30 microseconds for the minimum TOA gate and 125 microseconds for the maximum TOA gate. Illustrative relationships of these minimum and maximum TOA gates are shown, though not to scale, in FIG. 4.

The "listen-in" region may also be modified in the vertical plane by varying the lower and upper altitude gates using the apparatus of FIG. 3. Suitable values for mode G operation might be, for example, 2500 feet below and above the location of the 1090 MHz receiver, while suitable values for mode H might be only 500 feet below and above the 1090 MHz receiver's altitude reference.

Figure 5:
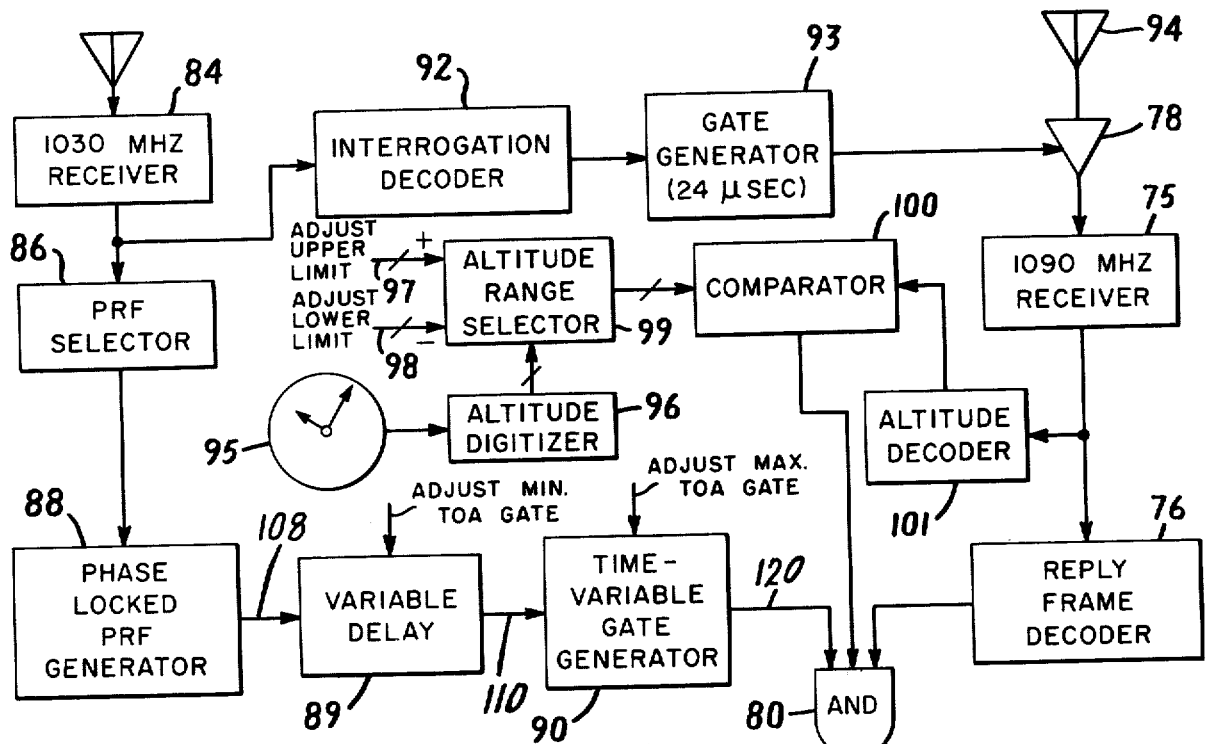
FIG. 5 is a block diagram of range and altitude gating apparatus which may be employed with the system of FIG. 3.

FIG. 5 shows the actual apparatus that may be used to adjust the minimum and maximum TOA gates and the lower and upper altitude gates for mode G or mode H operation. The apparatus includes a 1090 MHz receiver 75, a reply frame decoder 76, a transmisssion gate 78 for controlling the passage of signals from the receiver antenna 94 to the receiver 75 and an AND gate 80 through which a signal must pass from the reply frame decoder 76 to an indicator 82.

The apparatus of FIG. 5 also includes a 1030 MHz receiver 84, a PRF selector 86, and a phase-locked PRF generator 88 that functions to produce continuous clock pulses at the PRF of the selected SSR ground station. A suitable PRF selector is shown in FIG. 4 and a suitable phase-locked PRF generator is shown in FIG. 5 of my copending U.S. Pat. application No. 180,578 filed Sept. 15, 1971, and referred to above. The clock pulses produced by the PRF generator 88 are passed to a variable delay element 89, which produces an output pulse that determines the start of the "listen-in" interval. For example, the variable delay 89 may introduce a delay of 0.5 to 3.0 microseconds as the "listen-in" delay, or may introduce a larger delay before the start of the "listen-in" interval.

The delay pulse from the variable delay 89 is passed to time-variable gate generator 90. This gate generator outputs a gating signal for an adjustable interval upon receiving a pulse from the variable delay 89. This gating signal, which defines the length of the "listen-in" interval, is passed to the AND gate 80 and, upon coincidence with a pulse from the reply frame decoder 76, permits an indication of proximity by the indicator 82.

The apparatus of FIG. 5 is also provided with an interrogation decoder 92 and a 24 microsecond gate generator 93 connected to receive a pulse from the interrogation decoder 92 after each interrogation and apply an inhibiting signal to the transmission gate 78 for 24 microseconds thereafter. Thus, whenever the receiver 84 receives an interrogation, the energy received by the antenna 94 will not be passed to the receiver 75 for a period of 24 microseconds to give the system transponder (not shown) time to reply to the interrogation.

Finally, the apparatus of FIG. 5 is provided with an altitude decoder 101, connected to receive and decode the altitudes that are digitally encoded by the intruder (threat) aircraft's digitized altimeter for replying to mode C interrogations; a comparator 100; and an altitude range selector 99.

The selector 99 obtains an altitude reference from the digitized altimeter 95 and 96 of the subject aircraft and receives two digital numbers on lines 97 and 98 representing the upper and lower altitude limits, respectively. The upper limit value (such as 1,000 feet above the current altitude of the subject aircraft) is added, whereas the lower limit value (such as 1,500 feet below the current altitude) is subtracted from the altitude reference to give two numbers representing the limits of the altitude range surrounding the subject aircraft in which intruder aircraft will be monitored. These two numbers defining the altitude range are then applied to the comparator 100 for comparison with the altitudes of the replying intruder aircraft. The comparator 100 produces an output signal, enabling the AND gate 80, whenever the altitude in a reply lies within the altitude range determined by the selector 99.

In operation, the apparatus of FIG. 5 provides an indication of the proximity of an intruder aircraft whenever a reply is received from the transponder of that aircraft while it is flying within the region between the inner ellipse, as defined by the variable delay 89; the outer ellipse, as defined by the time-variable gate generator 90; and the lower and upper altitudes as defined by the altitude range selector 99. The apparatus of FIG. 5 does not permit an indication of an intruder aircraft that is flying in the same SSR beam within an inner ellipse of 24 microseconds, since the antenna 98 is disabled for that length of time to permit the reply to the interrogations received by the 1030 MHz receiver 84. However, as will be explained in detail hereinafter, a reply transmission may be periodically suppressed so that the gate generator 93 can open early to receive the full message of a nearby aircraft. Obviously, any reply signals received from intruder aircraft either before or after the beam is dwelling on the subject aircraft permits these signals to be received even with a TOA value of less than 24 microseconds.

Figure 6:
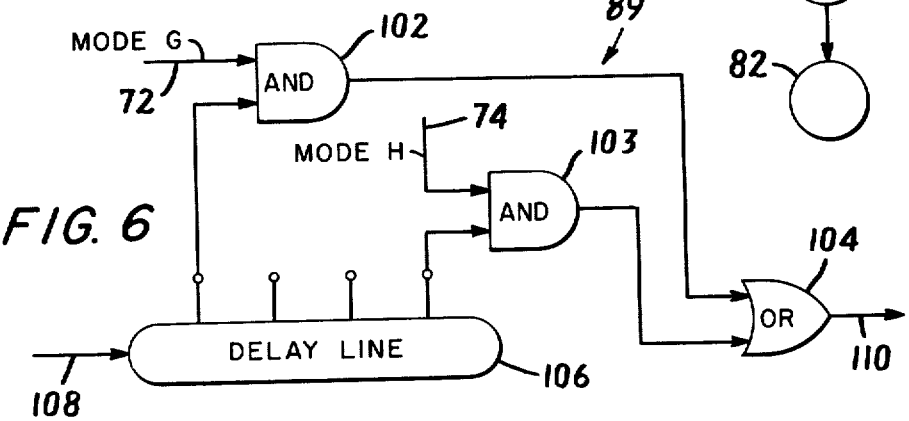
FIG. 6 is a block diagram of a variable delay device which may be employed with the apparatus of FIG. 5.

FIG. 6 shows one type of variable delay element 89 which may be used with the apparatus of FIG. 5 or with any of the other embodiments of the present invention. This variable delay comprises AND gates 102 and 103, OR gate 104, and a tapped delay line 106 connected as shown. An input pulse on line 108 from the phase-locked PRF generator 88 of FIG. 5 passes down the delay line first reaching the tap to the AND gate 102. If a mode G signal is present on line 72, the pulse is passed through this AND gate to the OR gate 104 and then to the output line 110. If a mode H signal is present on line 74, the input pulses on line 108 will, at some later known time, pass through the AND gate 103 to the OR gate 104 and the line 110. In this way the inner TOA gate can be set at any value desired by varying the delay introduced by the delay line 106.

Figure 7:
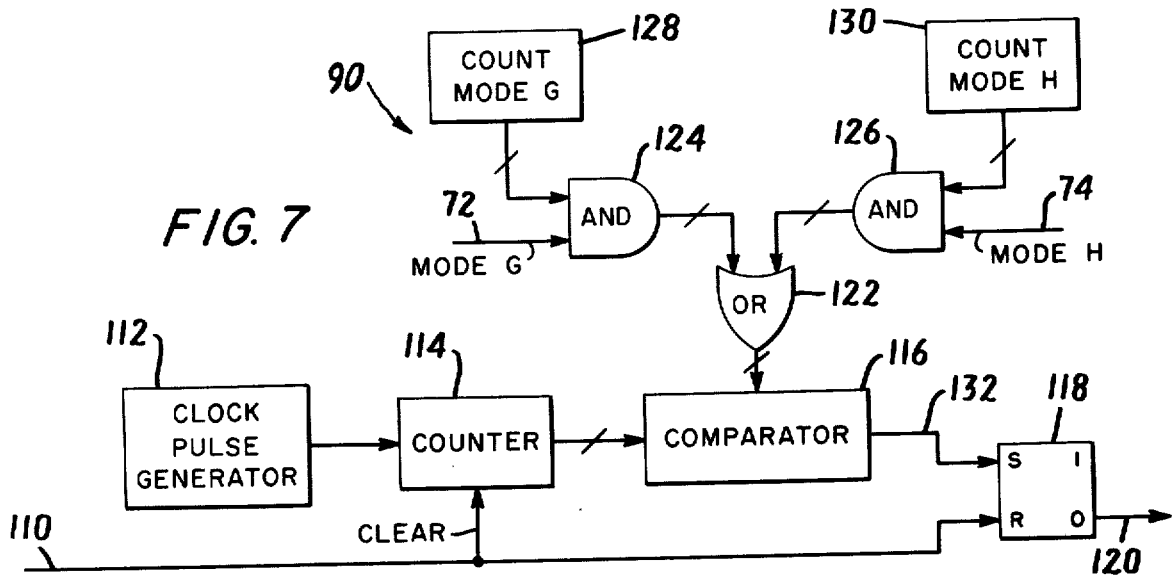
FIG. 7 is a block diagram of a time-variable gate generator which may be employed with the apparatus of FIG. 5.

FIG. 7 shows one type of time-variable gate generator 90 which may be used with the apparatus of FIG. 5 as well as with any of the other embodiments of the present invention. This gate generator comprises a clock pulse generator 112, a pulse counter 114, a comparator 116, and a flip-flop 118, all connected as shown. An input pulse on line 110 from the variable delay 89 clears the counter 114 to zero and sets the flip-flop 118 to its 0 state, energizing the output line 120.

The apparatus of FIG. 7 also includes an OR gate 122, AND gates 124 and 126, and count selectors 128 and 130 for selecting the length of the "listen-in" interval in modes G and H, respectively. The two selectors 128 and 130 may, for example, comprise manually operable code wheel switches for setting up a desired "listen-in" interval count for the respective operating modes.

In operation, the apparatus of FIG. 7 provides a means for varying the outer gate limit of the "listen-in" interval. A pulse on line 110, indicating that the "listen-in" interval has begun, clears the counter 114 and energizes the output line 120 which leads to the AND gate 80 of FIG. 5. Assuming that mode G operation is indicated by the apparatus of FIG. 3, an input signal will be present on line 72 enabling the count selected by the mode G count selector 128 to pass through the AND gate 124, the OR gate 122 and be applied to the comparator 116. Concurrently, the counter 114 will have begun counting clock pulses from the clock pulse generator 112. When the counter has counted a number of clock pulses equivalent to the count being applied to the comparator by way of the OR gate 122, the comparator produces an output pulse on line 132, setting the flip-flop 118 to its 1 state and de-energizing line 120, thereby terminating the gate signal to AND gate 80 of FIG. 5.

Operation of the apparatus of FIG. 7 is, of course, similar if an input signal is present on line 74, indicating mode H. In this case the mode H count of the selector 130 is passed to the comparator 116 to determine the length of the gate interval.

Figure 8:
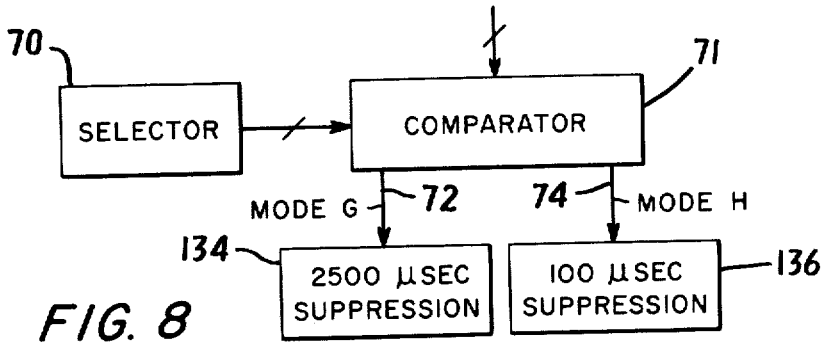
FIG. 8 is a block diagram of another control system which may be employed with any embodiment of the present invention.

FIG. 8 shows apparatus for further employing the mode G and mode H operational condition signals on the output lines 72 and 74 of the comparator 71 to adaptively modify the "listen-in" characteristics of the proximity indicating system. A characteristic of the embodiment of the present invention shown in FIG. 5 is that the inner TOA gate may not be adjusted to a value of less than 24 microseconds when interrogations are received so that the system's own reply will not be received by the 1090 MHz receiver 75. The apparatus of FIG. 8 shows one way of overcoming this restriction within the existing national standards.

On Dec. 18, 1972, the Federal Aviation Administration (FAA) adopted a modification to the basic SSR system standard — effective Jan. 26, 1973 under Amendment 135-34 to the Federal Aviation Regulations (FAR) — that, in effect, allows an aircraft to "skip" one reply during each SSR beam passage. The actual FAR criterion is somewhat more complicated in that it allows a maximum transponder "dead time" of 2,500 microseconds at an 18 Hz rate. Thus, "dead time" for SSR transponders can total 18 times 2,500 or 45,000 microseconds out of each second, or 4.5 percent of the time.

The apparatus of FIG. 8 provides a means for employing the FAR "missed" reply criteria to enhance the operating characteristics of the proximity indicating system. Two 1090 MHz transponder reply suppression methods are shown. Upon receiving a mode G operating condition signal on line 72, a 2,500 microsecond suppression element 134 arbitrarily suppresses the aircraft transponder reply capability for a period of 2,500 microseconds 18 times each second. Upon receiving a mode H operating condition signal on line 74 representing a more dense interrogation environment, a second alternative is suggested. In this case, a 100 microsecond suppression element 136 automatically suppresses the transponder reply capability for a period of 100 microseconds approximately 18 times each second in synchronism with received interrogations. This synchronization of the 100 microsecond suppression mode permits the reception of replies from transponders located within a common interrogating beam and immediately adjacent to the subject aircraft's position while reducing the reply suppression period by a factor of 25. This mode has the obvious advantage of allowing a reply to another interrogation from an air or a ground source to take place during the following 2,400 microseconds, which reply would otherwise be denied.

Figure 9:
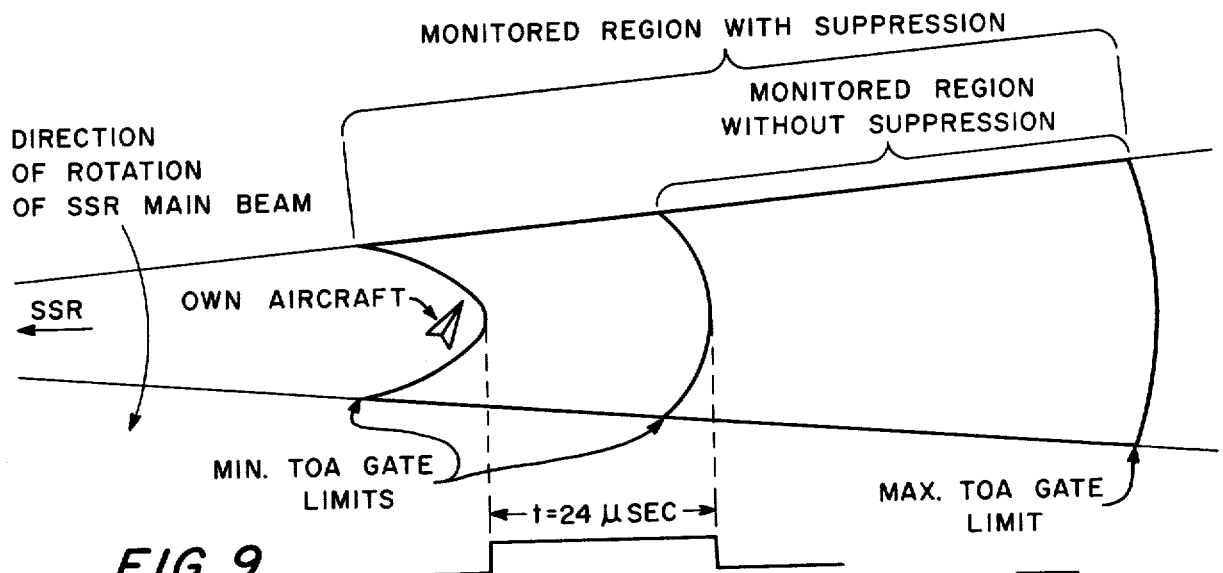
FIG. 9 is a geometrical diagram showing a secondary surveillance radar beam and one aircraft equipped with the system of FIG. 8, and showing the "listen-in" regions monitored with and without the activation of the system of FIG. 8.

FIG. 9 graphically depicts the advantage to be gained by allowing the suppression of a transponder reply to selected interrogations. With the suppression element 136 of FIG. 8 in operation, the inner ellipse of the monitored region moves in and surrounds own aircraft permitting virtual "wing tip to wing tip" proximity indication.

Figure 10:
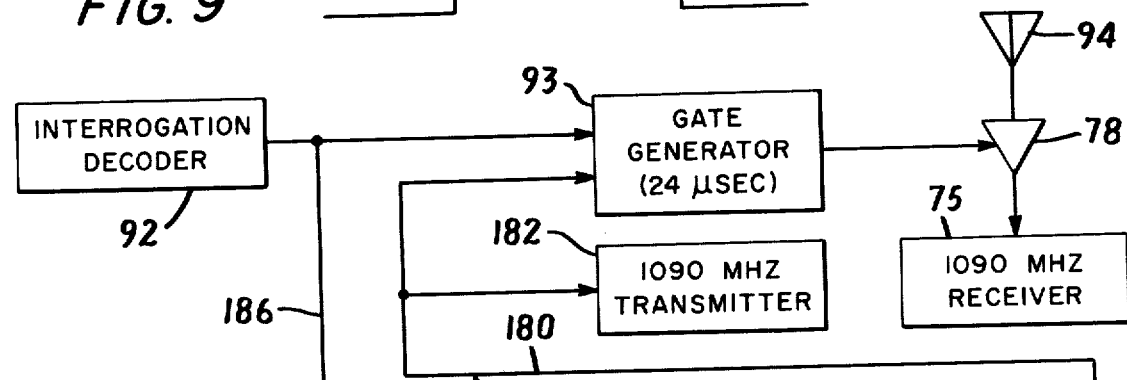
FIG. 10 is a block diagram of suppression control apparatus which may be employed with the system of FIG. 8.
Figure 10:
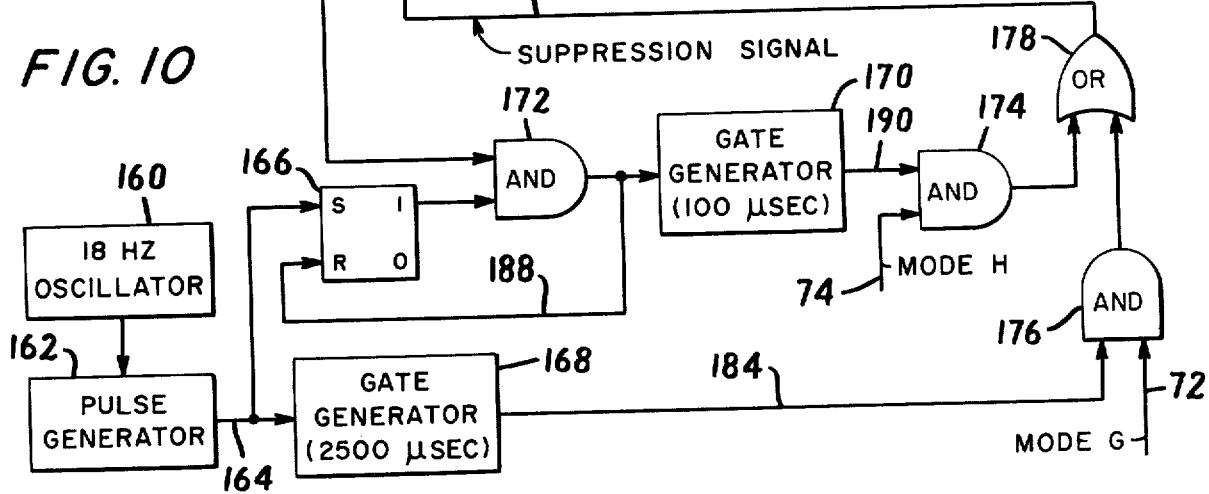

FIG. 10 shows one type of suppression apparatus that combines the suppression elements 134 and 136 of FIG. 8. The apparatus of FIG. 10 includes the interrogation decoder 92, the 24 microsecond gate generator 93, antenna 94, transmission gate 78, and the 1090 MHz receiver 75, connected as shown and operative, as described in connection with FIG. 5, to inhibit the reception of transponder replies for a period of 24 microseconds after an interrogation is received.

The apparatus of FIG. 10 is additionally provided with an 18 Hz oscillator 160 and a pulse generator 162 for producing an output pulse 18 times each second on line 164. Included also are a flip-flop 166, gate generators 168 and 170, AND gates 172, 174 and 176, and an OR gate 178, connected as shown and operative to produce a suppression signal on line 180. The suppression signal on line 180 is used to suppress a reply to an interrogation by inhibiting operation of the 1090 MHz transmitter 182 of the system's transponder and to inhibit the gate generator 93.

In operation, the apparatus of FIG. 10 provides a method of selecting a mode G 2,500 microsecond reply suppression that is arbitrarily applied at a frequency of 18 Hz or a mode H 100 microsecond reply suppression that is applied in response to a received interrogation at about, but no more often than, 18 times per second. The pulse on line 164, produced by the oscillator 160 and pulse generator 162 at a frequency of 18 Hz, sets the flip-flop 166 to its 1 state, energizing one input of the AND gate 172, and also initiates the 2,500 microsecond gate generator 168. The gate generator 168 produces a 2,500 microsecond signal on line 184 and, should a mode G operating condition signal be present on line 72, the 1090 MHz transmitter 182 and the 24 microsecond gate generator 93 are suppressed by way of the AND gate 176, OR gate 178 and the line 180.

Upon receipt of an interrogation, the interrogation decoder 92 will produce a pulse on line 186 that passes through the AND gate 172 and initiates the 100 microsecond gate generator 170. The ouptut of the AND gate 172 is also fed back, via line 188, to reset the flip-flop 166 to its 0 state, thereby preventing a re-initiation of the 100 microsecond gate generator 170 until the flip-flop has again been set to its 1 state by the pulse generator 162. Upon initiation of the 100 microsecond gate generator 170, a signal will appear on line 190 and will, with the presence of a mode H operating condition signal on line 74, result in the suppression of the 1090 MHz transmitter 182 and the 24 microsecond gate generator 93, by way of the AND gate 174, OR gate 178 and line 180, for a period of 100 microseconds.

Figure 11:
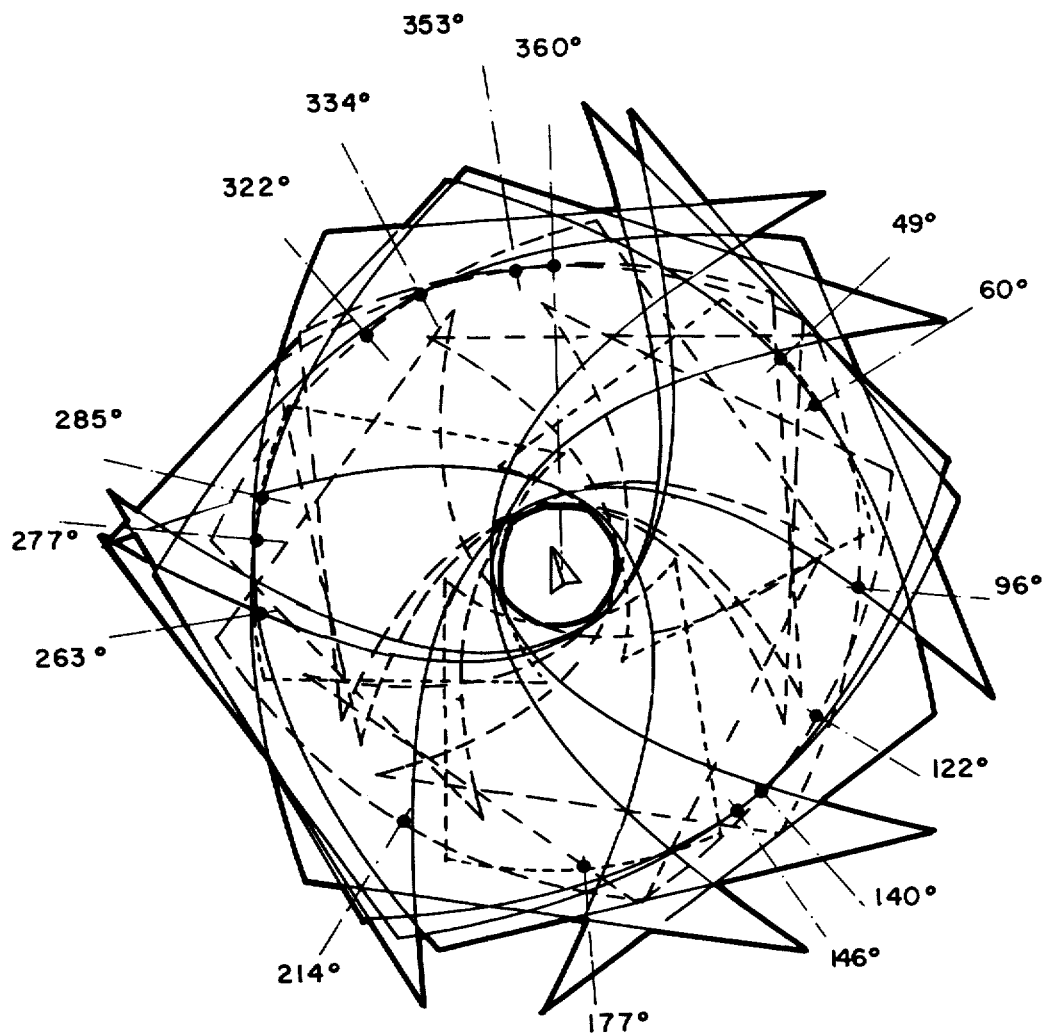
FIG. 11 is a geometrical diagram showing the "listen-in" regions which are monitored in an environment in which 15 SSR ground stations are interrogating one aircraft.

Although the discussion above and illustrations in FIGS. 4 and 9 have analyzed the operation of the proximity indicating system in terms of its response to a single interrogating beam, it must be emphasized that, under normal conditions, the subject aircraft will be within line of sight of a large number of SSR ground stations. FIG. 11 illustrates the horizontal regions which would be monitored if the subject aircraft were interrogated by fifteen ground stations arranged at various angles with respect thereto. By superposition of the monitored regions associated with each radar beam, the subject aircraft is entirely surrounded by a nearly circular "listen-in" region through which no intruder aircraft may penetrate without detection.

Figure 12:
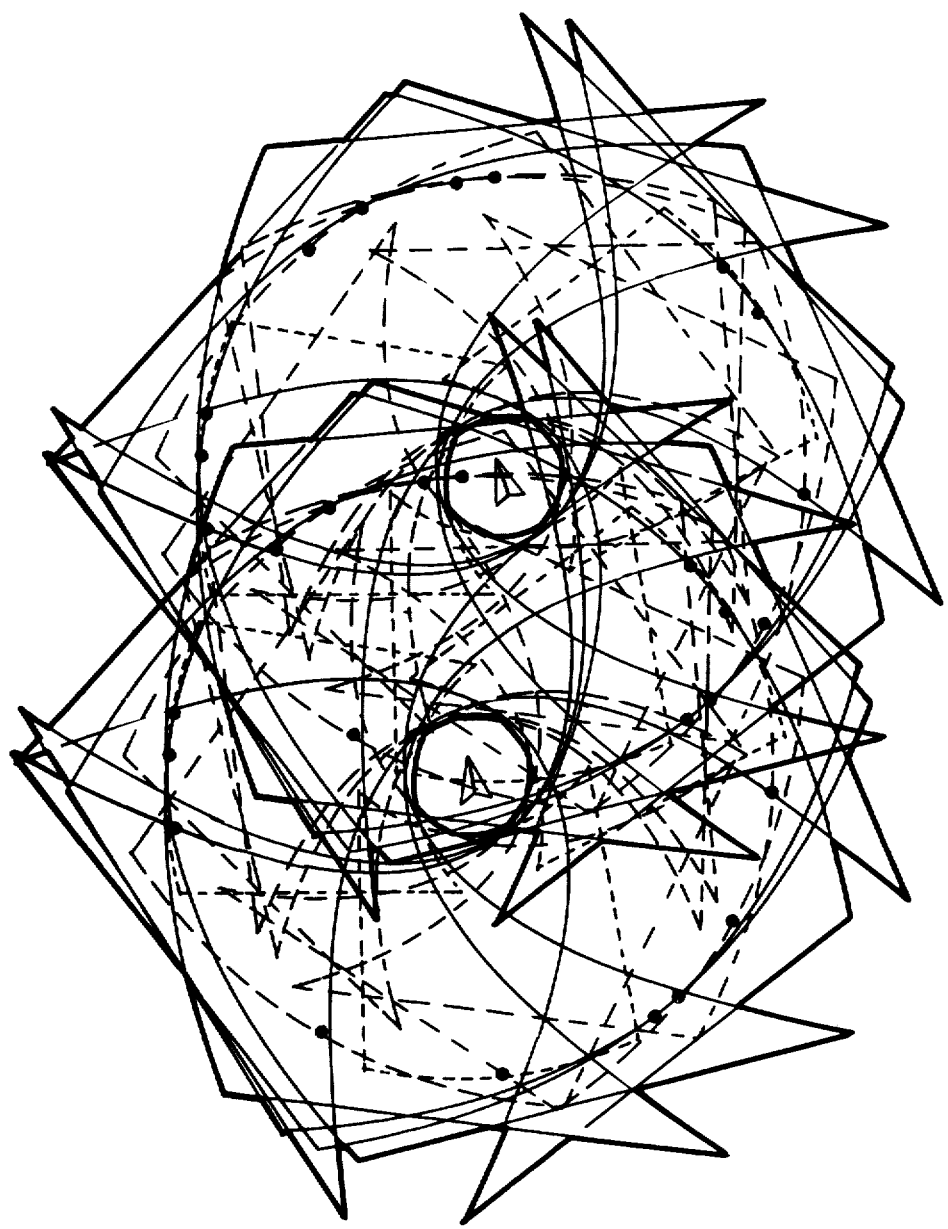
FIG. 12 is a geometrical diagram showing the "listen-in" regions which are monitored in an environment in which 15 SSR ground stations are interrogating two aircraft.

The situation in which two aircraft fall within each other's "listen-in" region is illustrated in FIG. 12. In this case, both aircraft are interrogated by the same 15 ground stations and, accordingly, are surrounded by similar "listen-in" regions. As a result, each aircraft will detect the presence of the other at approximately the same time.

Figure 13:
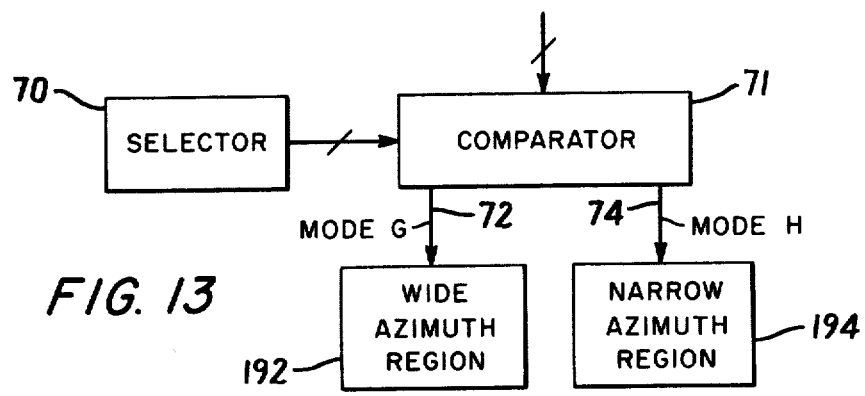
FIG. 13 is a block diagram of another control system which may be employed with any embodiment of the present invention.

FIG. 13 shows an additional application of the mode G and mode H operating condition signals on lines 72 and 74, respectively, in order to permit the subject aircraft to monitor a variable widened azimuth region for a proximity indication of an intruder aircraft. Apparatus for providing widened azimuth regions are shown and described in my co-pending patent application Ser. No. 130,952, filed Apr. 5, 1971, and referred to above. It will be understood that the application of such apparatus to the present invention will fall within the scope of the present invention. Appropriately, the wide azimuth region element 192 is associated with a mode G operating condition while the narrow azimuth region element 194 is associated with a mode H operating condition. This arrangement, while meant to be merely representative, permits the own aircraft to monitor the larger region when being interrogated by few SSR ground stations.

While the control system of FIG. 13 is shown to be operative with the two adaptive modes G and H, it should again be emphasized that these modes are intended to be merely exemplary of the many possible modes which may be generated and used. A greater number of modes of operation is, of course, contemplated by the present invention and, in addition, the modes which operate the control system of FIG. 13 need not be the same as the modes which operate other control systems of the present invention; e.g., control systems of the type illustrated in FIGS. 3 and 8.

FIG. 14 shows a geographical representation of the adjustments possible by means of the apparatus of FIG. 13.

Figure 15:
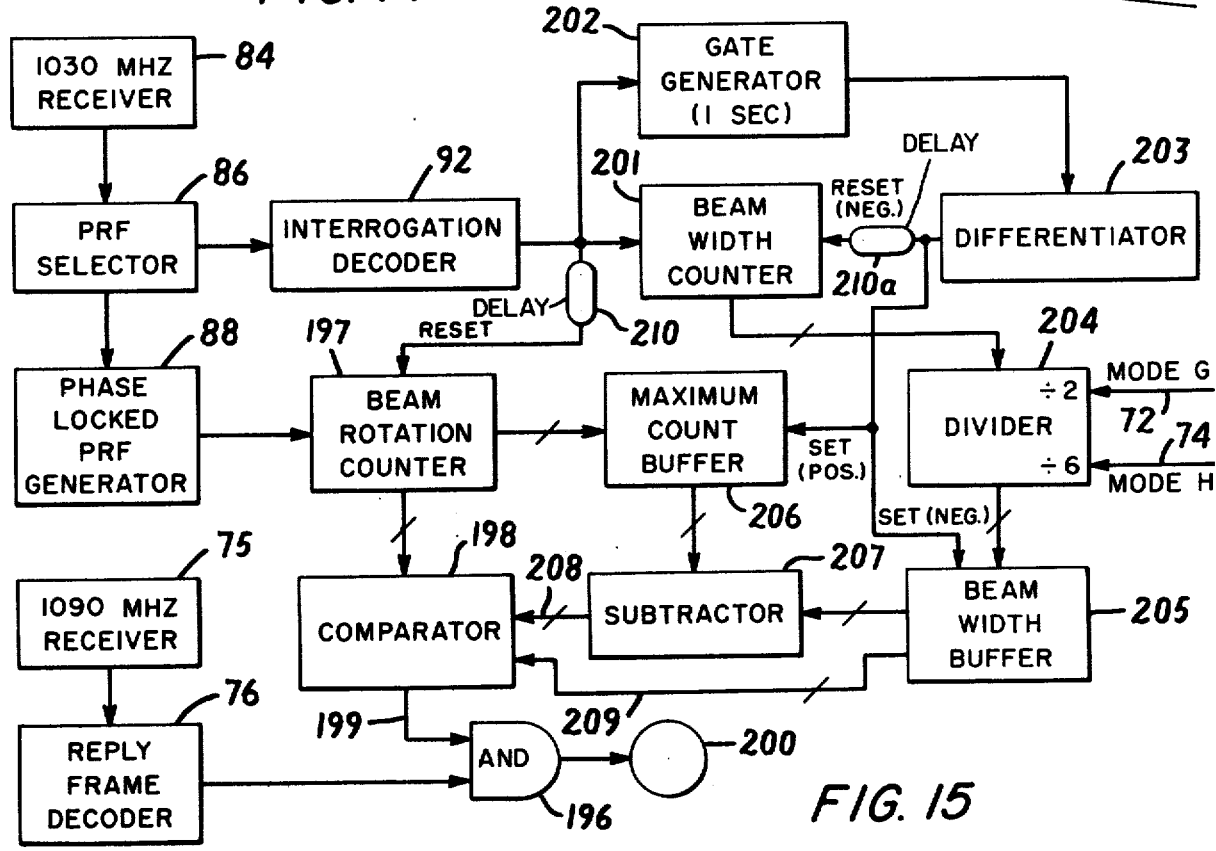
FIG. 15 is a block diagram of widened azimuth selecting apparatus which may be employed with the system of FIG. 13.

FIG. 15 shows one type of widened azimuth sector control system for providing a variable width azimuth region as indicated by elements 192 and 194 of FIG. 13 and the graphical representation of FIG. 14. The apparatus of FIG. 15 includes a 1090 MHz receiver 75 and a reply frame decoder 76 for applying reply pulses to one input of an AND gate 196 as described above in connection with FIG. 5.

The apparatus of FIG. 15 also includes a 1030 MHz receiver 84, a PRF selector 86, and a phase-locked PRF generator 88 for providing continuous clock pulses at the specific PRF of a selected SSR ground station, as described above in connection with FIG. 5. These clock pulses are supplied to a beam rotation counter 197 which counts the pulses and is reset to 0 each time an actual interrogation at the selected PRF is received by the 1030 MHz receiver 84 and decoded by the interrogation decoder 92. The beam rotation counter 197 is reset a short (e.g., 1 microsecond) time after the receipt of each decoded interrogation — the delay being introduced by a short delay line 210— and is allowed to count after the last interrogation of each beam dwell during the period when the SSR beam rotates completely around and again directs its interrogations at the selected PRF to the 1030 MHz receiver 84.

It will be understood that the instantaneous count in the beam rotation counter 197 is directly related to the instantaneous azimuth of the selected rotating SSR beam. Accordingly, it is possible to produce a timing signal whenever the main beam lies within a particular azimuthal sector. Such a timing signal is produced in this apparatus by a comparator 198 at its output 199. The desired width of the widened azimuth sector may be selected and two appropriate count values applied to the comparator 198 via lines 208 and 209. The widened azimuth timing signal on line 199 will be continuously present whenever the count in the beam rotation counter 197 lies below a lower count value (when the beam is directed toward and begins to traverse away from the subject aircraft) and above a higher count value (when the beam has rotated around nearly 360° and its leading edge has almost reached the subject aircraft). Should a transponder reply be received by the 1090 MHz receiver 75 and be decoded by the frame decoder 76 during the time that the timing signal is present, a pulse from the decoder will be passed by AND gate 196 to the indicator 200 and/or to time of arrival (TOA) measurement circuits as will be discussed below in connection with FIG. 29.

The apparatus in FIG. 15 for selecting the width of the widened azimuth sector includes a beam width counter 201, a 1 second gate generator 202, a differentiator 203, a divider element 204, a beam width buffer 205, a maximum count buffer 206 and a subtractor element 207, connected as shown. In operation, the beam width counter 201 counts the number of interrogations received during each beam dwell and transfers this number, divided by a prescribed factor in dependence upon the mode of operation, to the beam width buffer 205. This transfer is effected by a negative-going pulse from the differentiator 203 approximately one second after the beam width counter 201 has started counting - i.e., sometime after the rotating beam has traversed the position of the subject aircraft. After a short delay introduced by the delay element 210a the beam width counter 201 is reset to zero. Similarly, the maximum count buffer 206 is set to receive the count in the beam rotation counter 197 by a positive-going pulse from the differentiator - i.e., at the time that the leading edge of the rotating beam again traverses the position of the subject aircraft. Due to the short delay introduced by the delay element 210, the beam rotation counter 197 is not reset until its maximum count has been transferred.

The beam width count of the desired azimuthal sector, which is stored in the beam width buffer 205, is subtracted from the maximum count in the subtractor 207 and the result is applied to the comparator 198 via the line 208. When the beam rotation counter 197 next reaches the count value appearing on line 208, the comparator 198 produces an output signal on line 199, and maintains this signal until the beam rotation counter is reset to zero.

The beam width count in the beam width buffer 205 is also applied directly to the comparator 198 via the line 209. So long as the count value in the beam rotation counter 197 is less than the count on line 209, the comparator 198 produces a continuous output signal on line 199. The signal on line 199 is terminated when the comparator measures the beam rotation count as a value that exceeds the value on line 209. Thereafter, the signal on line 199 is not reactivated until the beam rotation count reaches a value greater than the count on line 208. A continuous signal is then again sustained as long as the count in the beam rotation counter 197 exceeds the count on line 208.

During the period of beam dwell in which interrogations are received and decoded by the interrogation decoder 92, the beam rotation counter will count one pulse from the phase locked PRF generator 88, and then be reset to zero by a pulse from the delay element 210. Accordingly, the count in the beam rotation counter 197 will alternate between a one and a zero during this period and will at no time exceed the count value on line 209. Consequently, the signal on line 199 will be present during the period of beam dwell, in addition to the periods prior to the arrival of the leading edge and after the passage of the trailing edge of the beam.

It is, of course, possible to modify the apparatus so that a widened azimuthal gating signal, such as the signal on line 199, is produced only when the beam is in the widened azimuthal sectors immediately forward of and after (in the beam rotation sense) the beam dwell sector encompassing the subject aircraft. Such apparatus, which will be described below in connection with FIG. 29, may be useful because, if the "listen-in" period is synchronized with the widened azimuthal gating signal, it is possible to measure TOA values and to decode intercepted messages prior to the arrival of the leading edge of the beam, and specifically to decode any air-to-air range solicitation messages. For example, a widened azimuthal sector on either side of the beam may contain 10 messages sent by the adjacent (in-beam) and replying aircraft. Such transmitted messages can convey encoded data of value to the subject aircraft immediately outside of the scanning beam's leading or trailing edge. This reply message may be a normal altitude reply to ground interrogations with unused pulses employed to convey such data as a range solicitation message or possibly to relay the TOA value measured in the other (in-beam) aircraft. Significantly, the ability to listen-in synchronously in a precisely determined widened azimuthal sector prior to the arrival of the leading edge of the beam as well as after passage of the trailing edge of the beam permits this important exchange of slant range data to occur between only this specific pair of proximity aircraft, excluding all others.

As may be seen, the width of the widened azimuth sector is determined in the apparatus of FIG. 15 by the count value transferred to and stored in the beam width buffer 205. In the example shown, a mode G operating condition results in an azimuthal sector widening by one half and a mode H operating condition results in a widening by one sixth of a beam width. Clearly, any number of operating modes may be employed to produce any desired widening of the azimuthal "listen-in" sector.

As has been explained above in connection with FIGS. 5 and 15, it is desirable for certain purposes to "tune" the proximity indicating system to the specific PRF of a particular SSR ground station and to maintain sychronism with this ground station using a phase-locked PRF generator 88. As noted above, such a phase-locked PRF generator is disclosed in my copending U.S. Pat. application No. 180,578, filed Sept. 15, 1971. As is there described, this PRF generator can be synchronized with either the side lobe suppression (SLS) signals when the subject aircraft is within the side lobe suppression area surrounding the selected SSR ground station, or with the main beam burst of interrogation signals when the subject aircraft is outside the SLS area.

Since a more complex and expensive PRF generator is required to maintain synchronism with a main beam burst, it is desirable, in certain embodiments of the invention, to use only the decoded SLS signals as the synchronizing clock pulses for example, to substitute a $P_1 - P_2$ pulse pair decoder for the phase-locked PRF generator 88 in the apparatus of FIGS. 5 and 15. Apparatus for effecting this type of synchronization, even outside the normal SLS area of a selected SSR ground station, is shown in FIG. 16.

Figure 16:
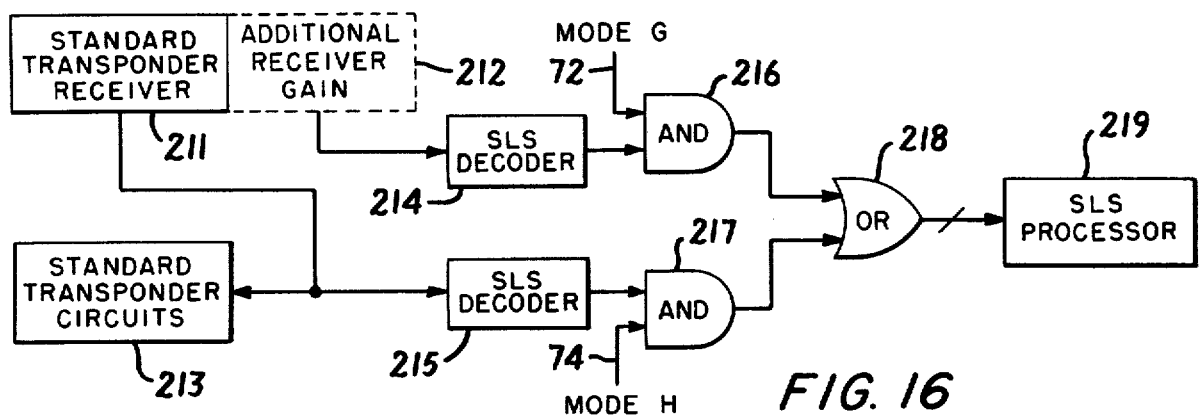
FIG. 16 is a block diagram of another contrl system which may be employed with an embodiment of the present invention.

FIG. 16 shows a standard transponder 1030 MHz receiver 211 connected at its normal 72-dbm output to the signal processing circuits of a standard transponder 213. With the receiver gain at this level, the SLS signals transmitted by a ground station cannot be detected at ranges greater than about 20 – 25 miles; i.e., outside an area about 40 – 50 miles wide surrounding the station. If, however, an additional stage or two is added to the receiver, as is shown in dashed lines 212 in FIG. 16, it is possible to increase the receiver gain and thus receive the SLS signals at greatly increased ranges from the transmitting ground station.

For example, if the receiver gain is increased from 72-dbm to about 85-dbm, the range will be increased from the normal 20 – 25 miles to 80 – 100 miles, since 12-dbm of gain provides approximately four times the range. In this case, a simple SLS decoder may provide the synchronization for the proximity indicating system within an approximately circular area up to 200 miles in diameter surrounding each SSR ground station.

In a crowded interrogation environment such as indicated by a mode H operating condition, the utilization of the extended range may be unnecessary and even undesirable. Accordingly, the apparatus of FIG. 16 is designed to adapt to the interrogation environment to provide a synchronizing SLS signal at either the normal or the extended range.

To effect this adaptive capability, there are provided two SLS ($P_1 - P_2$ pair) decoders 214 and 215; two AND gates 216 and 217, an OR gate 218 and an SLS processor 219 (for effecting the synchronization), connected as shown. If a mode G operating condition is indicated by a signal on line 72, the decoded SLS is taken from the additional gain section 212 of the 1030 MHz receiver, providing the extended range. However, if a mode H operating condition is indicated, the SLS is taken from the standard 72-dbm output of the transponder receiver 211.

Figure 17:
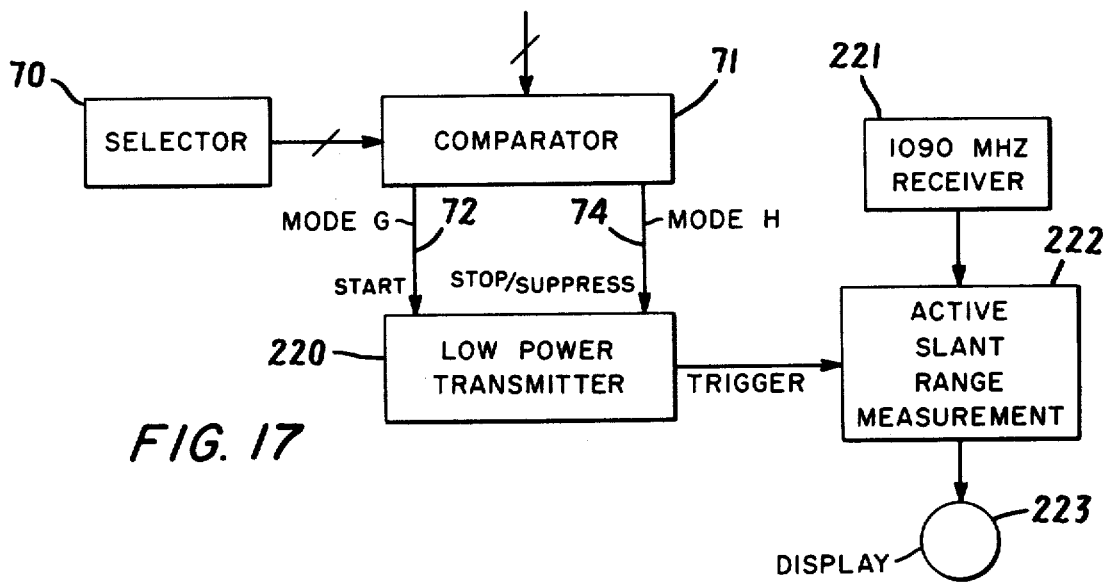
FIG. 17 is a block diagram of another control system which may be employed with any embodiment of the present invention.
Figure 23:
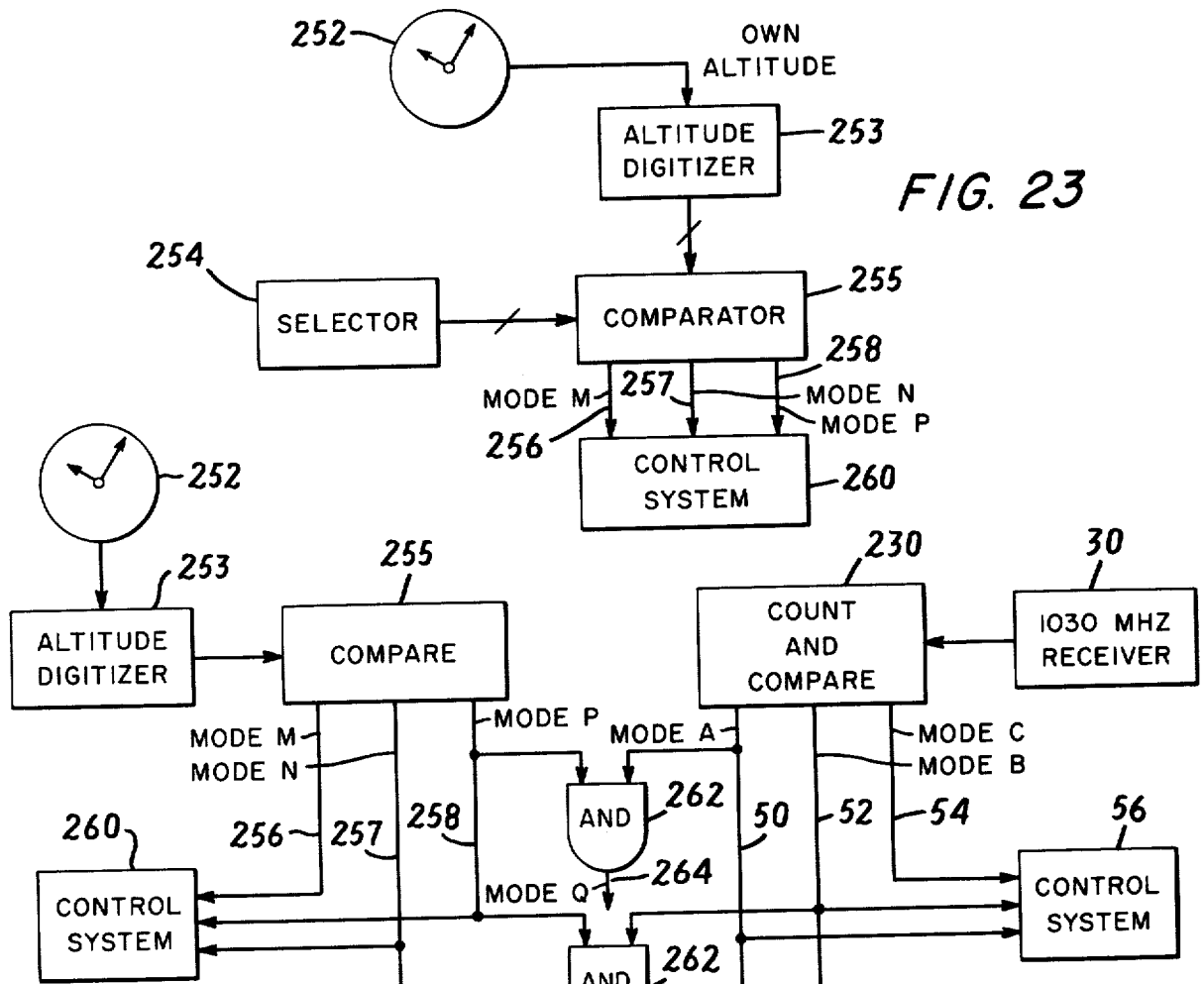
FIG. 23 is a block diagram of still another preferred embodiment of the present invention.

FIG. 17 shows apparatus for additional utilization of the mode G and mode H operating conditions as indicated by signals on lines 72 and 74, respectively. It may be desirable in regions where few or no SSR ground stations are interrogating, as when an aircraft is in transit over a large body of water, or for other reasons, for an aircraft to have the capability to actively "solicit" transponder replies from possibly threatening aircraft. Such solicitation is possible, for example, if the aircraft is equipped with an X pulse encoder and a 1090 MHz transmitter and the intruder aircraft is equipped with an X pulse decoder as shown in FIG. 23 of my copending patent application Ser. No. 317,810, filed Dec. 22, 1972, and referred to above. In addition, or in the alternative, the aircraft may be provided with a low power 1030 MHz interrogator that has its interrogation rate restricted to a very low value, say 5 to 10 times per second. A low interrogation rate is required as the national standards only allow a transponder to reply to "random triggering" at a rate which does not exceed 30 replies per second.

It is appropriate, therefore, to initiate some form of "active solicitation" in low interrogation rate environments, such as is encountered in mode G operating conditions. Accordingly, the apparatus of FIG. 17 provides a low power transmitter element 220 to be started by a signal on line 72 that represents a low interrogation environment. Activation of the element 220 triggers an active slant range measurement element 222 which measures the interval between a transmission and the receipt of a reply thereto by the receiver 221. The element 222 may comprise apparatus of the type disclosed in my copending application Ser. No. 317,810, filed Dec. 22, 1972, and referred to above. Upon receipt of a mode H operating condition indication on line 74, indicating an adequate interrogation environment of multiple SSR ground stations, the transmitter element 220 is stopped or suppressed and the active slant range measurement 222, if from a 1030 MHz interrogator 220, is no longer required for adequate proximity indication protection. If 1090-Mhz air-to-air interrogation is employed, area gates of the two proximity aircraft are the only ones responsive to their respective 1090-MHz interrogations, and therefore the adaptive change will be to use this mode of active slant range measurement in place of a 1030-MHz interrogation.

Figure 18:
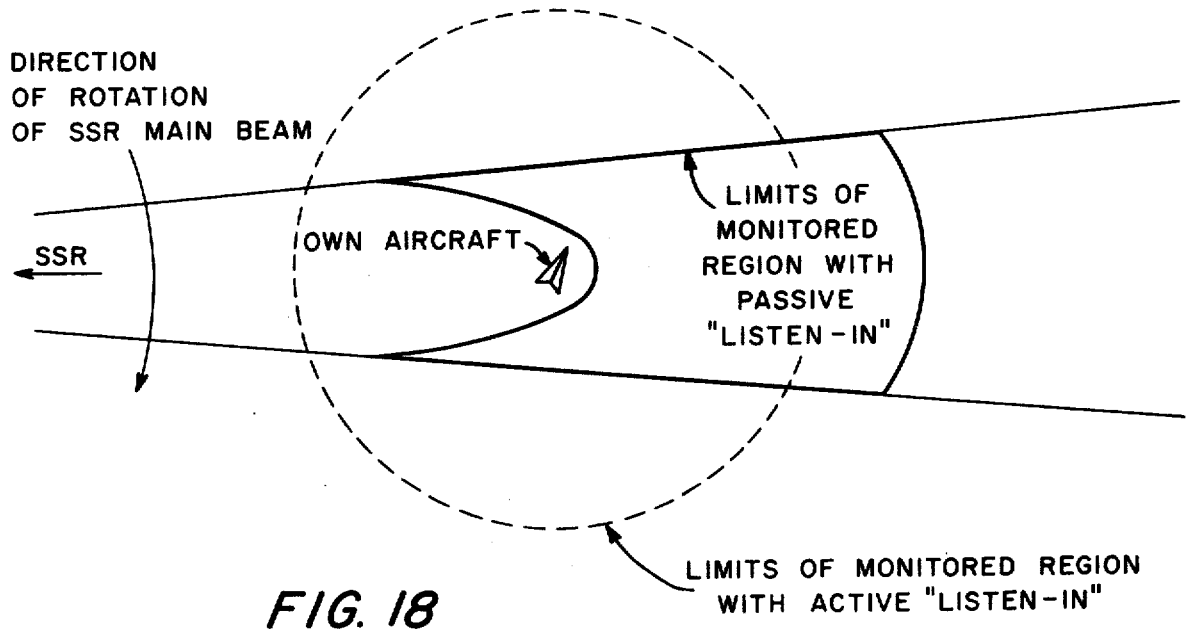
FIG. 18 is a geometrical diagram showing a secondary surveillance radar beam and one aircraft equipped with the system of FIG. 17, and showing the "listen-in" regions monitored passively and actively.

FIG. 18 is a graphical representation comparing the limits of the monitored region with active solicitation to the limits of the monitored region with passive "listen-in". As described above, the passive "listen-in" region is bounded by inner and outer elliptical curves representing the miminum and maximum TOA values and by the sides of the azimuth sector selected. Active solicitation is not lilmited to such a region; it provides a spherical zone of protection centered on the soliciting aircraft. It will be understood that such protection is particularly advantageous in regions covered by only one or two interrogating SSR ground stations. In addition, it is understood that a maximum active range gate is used to limit the active range measurements to values representing threats.

Figure 19:
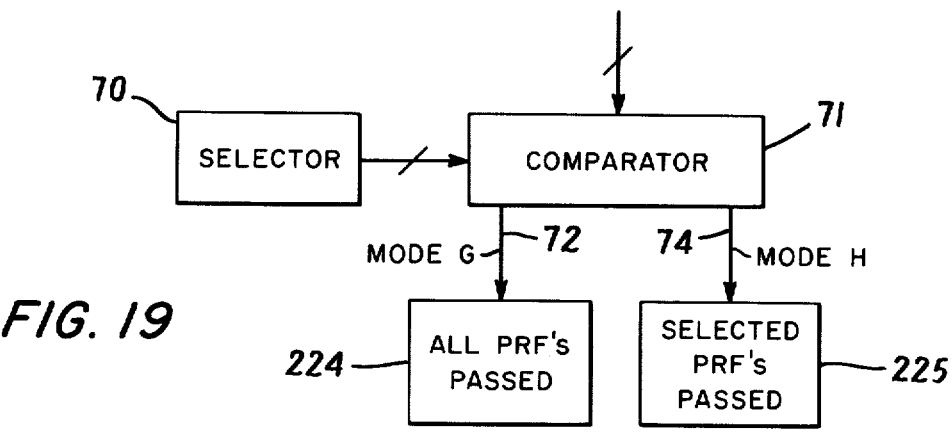
FIG. 19 is a block diagram of another control system which may be employed with any embodiment of the present invention.

FIG. 19 shows apparatus that uses the mode G and mode H signals on lines 72 and 74, respectively, to adaptively select the number of interrogations utilized for proximity indicating purposes. Such apparatus is appropriate in regions where the subject aircraft is being frequently interrogated, for example, at 35,000 feet where as many as 90 to 100 radars may be in line of sight of the aircraft's position. In the case where the comparator 71 is used to indicate only two modes of operation, it will be understood that mode G would appropriately permit the passage of all interrogations received as indicated by the block 224, while mode H should filter out some selected percentage of the received interrogations, as indicated by the block 225. With more than two modes of operation, a plurality of filtering percentages is possible and, clearly, a larger number of modes is contemplated by the present invention.

Figure 20:
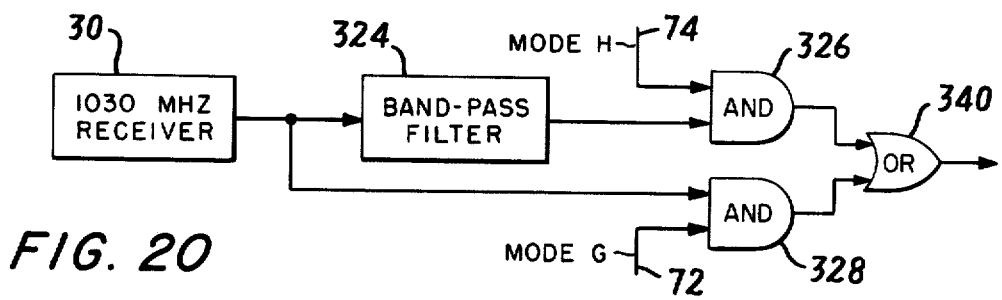
FIG. 20 is a block diagram of one type of PRF selection apparatus which may be employed with the system of FIG. 19.

FIG. 20 shows apparatus for adaptively selecting less than all interrogations for proximity measurement and indicating purposes. As described in my copending application Ser. No. 317,810 filed Dec. 22, 1972, referred to above, each SSR ground station within line of sight of an aircraft has a separate, unique PRF. The PRF's fall in the range of about 200 Hz to 400 Hz, separated by intervals of 4 or 5 Hz so that about forty to 50 separate PRF's are available for use by ground stations. In view of this, it is possible to filter out all but a selected percentage of the PRF's received by the 1030 MHz receiver by means of one or more bandpass filters. In the case in which only two modes of operation are used, a single band-pass filter may pass, say, one-fourth the frequencies between 200 and 400 Hz; for example, it may pass the range 250–300 Hz which accomodates about 10 PRF's. If additional modes of operation are used, additional band-pass filters may be employed to select different percentages of the 200 Hz-width band.

FIG. 20, which illustrates the use of mode G and mode H, shows a single band-pass filter 324, two AND-gates 326 and 328 and an OR gate 340. If the mode G operating condition is indicated by a signal on line 72, all the available PRF's are passed to the OR gate 340. If a mode H operating condition is indicated by a signal on line 74, a selected group of adjacent PRF's are passed.

In some embodiments of the present invention the proximity measurement and indicating system is provided with a PRF selector for each PRF. In this case, a different type of apparatus, such as that shown in FIG. 21, may be used. The apparatus of FIG. 21 comprises a 1030 MHz receiver 30; a plurality of AND gates 226, each provided with an inhibit input to prevent the passage of a pulse upon presence of a signal on the mode H line 74; and a plurality of PRF selectors 228. Each PRF selector is adjusted to pass a separate PRF in the band from 200 to 400 MHz. The apparatus of FIG. 21 may be provided with forty or fifty PRF selectors 228 as may be required to individually select every SSR ground station PRF that may be encountered.

Figure 21:
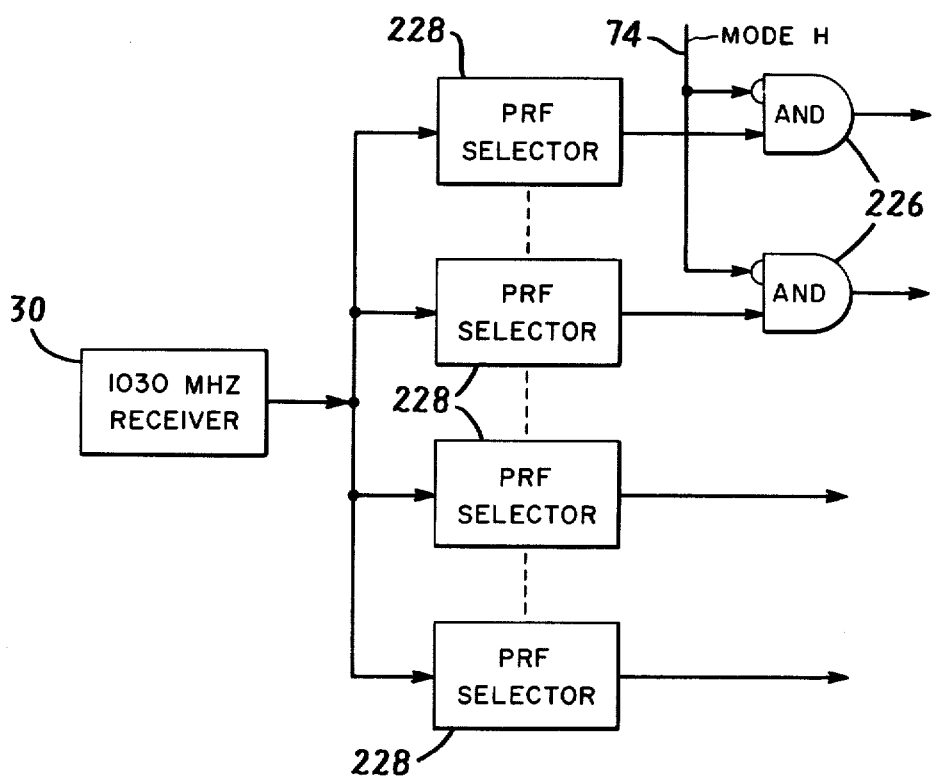
FIG. 21 is a block diagram of another type of PRF selection apparatus which may be employed with the system of FIG. 19.

In operation, the apparatus of FIG. 21 inhibits, say, 75 percent of the PRF's upon receipt of a signal on line 74 indicating a mode H operating condition or high density ground interrogation environment. It will be understood that the apparatus of FIG. 21 may be modified with the addition or subtraction of AND gates to vary the number of PRF's that are inhibited depending upon the number of operating modes selected.

FIG. 22 shows apparatus which may be used to combine the interrogation rate and the reply rate information available in the apparatus of FIG. 1 to produce additional operating mode indications. As in the embodiment of FIG. 1, this apparatus includes a 1030 MHz receiver 30 and a 1090 MHz receiver 31. A count and compare element 230 is provided for decoding and counting the received interrogations, comparing the count totaled to a selected standard, and producing an output signal on line 50 to indicate a mode A operation, on line 52 to indicate mode B operation or on line 54 to indicate mode C operation. A similar count and compare element 232 is provided for producing a signal on line 51 for a mode D operation on line 53 for mode E operation or on line 55 for mode F operation in dependence upon the rate of receipt of transponder replies.

The apparatus of FIG. 22 also includes AND gates 234 connected to provide indications on lines 236, 238, 240, and 242 that represent the various combinations of modes B, C, D and E as new modes I, J, K and L, respectively. A mode K signal on line 240, for example, indicates that the interrogation rate is medium while the reply rate is low in the immediate environment. Notwithstanding these new modes, the control systems 56 and 57 receive their respective modes A–C and D–F and may operate independently as described above in connection with FIG. 1.

It will be understood that the mode I, J, K and L signals may be used to adaptively modify the available proximity indicating devices, such as the rate and type of active range solicitation 244, the type of passive range determination 245, the minimum TOA gate 246, the maximum TOA gate 247, the width of the azimuth sector 248, the degree of reply suppression 249, and the lower and upper altitude gates 250 and 251. In this manner, the proximity indicating system may be adaptively modified or "tailored" to suit the surrounding environment.

FIG. 23 shows another embodiment, according to the present invention, wherein the selection of a suitable mode of operation depends upon the altitude of the craft equipped with an adaptive modification capability. The apparatus of FIG. 23 includes an altimeter 252 and an altitude digitizer 253 of known type that provide an input to a comparator 255. In a manner similar to the operation of the embodiments of FIG. 1, the comparator 255 compares the digitized altitude with one or more altitudes determined by the selector 254 and produces an output on one of three lines 256, 257 and 258, representing modes M, N and P, respectively. As in the earlier described embodiments of the present invention, the outputs on lines 256 – 258 may be used to adaptively modify the control system of the proximity indicating apparatus.

The capability to adaptively modify the operation of the proximity indicating system in response to the subject aircraft's altitude is useful, since such altitude is generally an indication of the nature of its flight. For example, at altitudes above, say 20,000 feet, an aircraft is probably flying at higher speeds and in transit between terminal areas. Under such flight conditions, it is desirable to expand the region monitored for proximity of intruder aircraft. In addition, at higher altitudes the line of sight to the ground environment is such as to increase the number of interrogations, and altitude may be used to selectively minimize the measurements of proximity signals by using adaptive means such as band-pass filters of certain bands of PRF interrogations as described above in connection with FIGS. 19 – 21.

It will be understood that it is within the scope of the present invention also to adapt to the aircraft's speed directly, for example by substituting an airspeed indicator for the altimeter 252 and an airspeed digitizer for the altitude digitizer 253 in the apparatus of FIG. 23. In addition, it is possible to adapt to the rate or to the direction of change of altitude, by adding a differentiating element and an associated comparator to the apparatus of FIG. 23.

It will also be understood that altitude indicative modes M, N and P may be combined with other adaptive characteristics, as was done in the apparatus of FIG. 22, to provide a separate series of operating modes. By way of example, FIG. 24 shows apparatus for accomplishing this combination and includes an altimeter 252, an altitude digitizer 253, a comparator 255, a 1030 MHz receiver 30 and a count and compare element 230 similar to that described in connection with FIG. 22.

Figure 24:
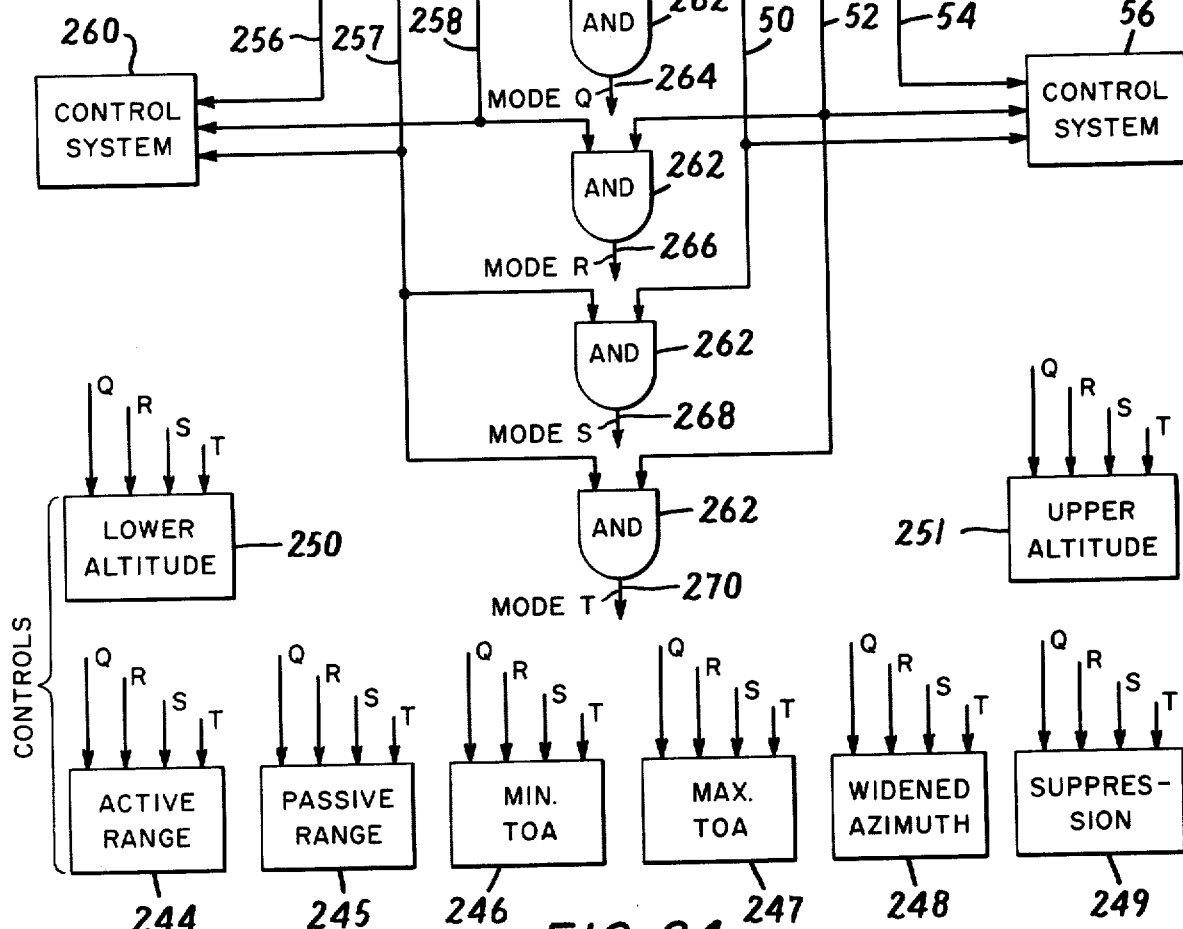
FIG. 24 is a block diagram of still another preferred embodiment of the present invention.

The apparatus of FIG. 24 further includes AND gates 262 for combining the mode N and mode P indications on lines 257 and 258 with the mode A and mode B indications on lines 50 and 52, and for producing operating mode condition output signals on lines 264, 266, 268, and 270. As in the apparatus of FIG. 22, these outputs represent the possible combinations of mode N, mode P, mode A, and mode B operating conditions.

Notwithstanding these new modes, the control systems 56 and 260 receive their respective modes A – C and M – P and may operate independently as described above in connection with FIGS. 1 and 22.

It will be understood that the outputs on lines 264, 266, 268 and 270, representing modes Q, mode R, mode S, and mode T operating conditions, respectively, may be used to adaptively modify the operation of the proximity indicating system. Accordingly, FIG. 24 includes the various modifiable elements 244-251 that are shown in FIG. 22. It will be understood that the present inventiton is not limited to the combinations of proximity indicating devices shown in FIGS. 22 and 24 but may comprise any combination of devices by which the proximity indicating system may be adaptively modified in accordance with the present invention.

Figure 25:
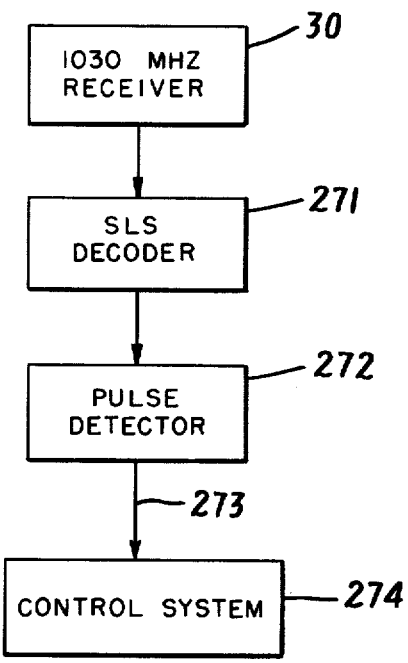
FIG. 25 is a block diagram of still another preferred embodiment of the present invention.

FIG. 25 shows another embodiment of the present invention, wherein the proximity indicating system may be adaptively modified in response to the side lobe suppression (SLS) signal level of an SSR ground station. The apparatus of FIG. 25 includes a 1030 MHz receiver 30; a proximity indicating system control element 274; an SLS decoder 271, which produces output pulses when the 1030 MHz receiver 30 is located within the range of the SLS of an SSR ground station; and a pulse detector 272.

The SLS decoder 271 may be of the type shown in FIG. 9 of my co-pending patent application Ser. No. 130,952, filed Apr. 5, 1971, and referred to above. Within the side lobe suppression area surrounding an SSR ground station, i.e., within about 20 to 25 miles of the station, a P1-P2 pulse pair is received by the 1030 MHz receiver 30 and decoded by the SLS decoder 271. At distance beyond the side lobe suppression area, no P2 pulses are received and under these conditions the SLS decoder 271 produces no output. The pulse detector 272 senses the presence or absence of an output from the SLS decoder 271 and, if an output is present, produces a signal on line 273. A signal on line 273 thus indicates that the aircraft is located within range of the SLS of an SSR ground station.

The signal on line 273 may be utilized, in a manner which has previously been described, to adaptably modify the operation of the proximity indicating system. For example, as has been described above, it is possible to produce synchronized clock pulses or a "synthetic" SLS, when outside the range of the SLS of an SSR ground station, using a phase-locked PRF generator which maintains an oscillator in phase and frequency with interrogation bursts from the rotating main beam of that ground station. Thus, when the subject aircraft is within range of the SLS and a signal is present on line 273, this signal may be used to adapt the proximity measurement and indicating system to operate with the "true" SLS for synchronization in the manner described above in connection with FIG. 16. And conversely, when the subject aircraft is outside the range of the SLS and a signal is absent from line 273, the proximity measurement and indicating system may be switched to operate on the "synthetic" SLS generated by a phase-locked PRF generator, such as the generator 88 that is shown and described above in connection with FIGS. 5 and 15.

Figure 26:
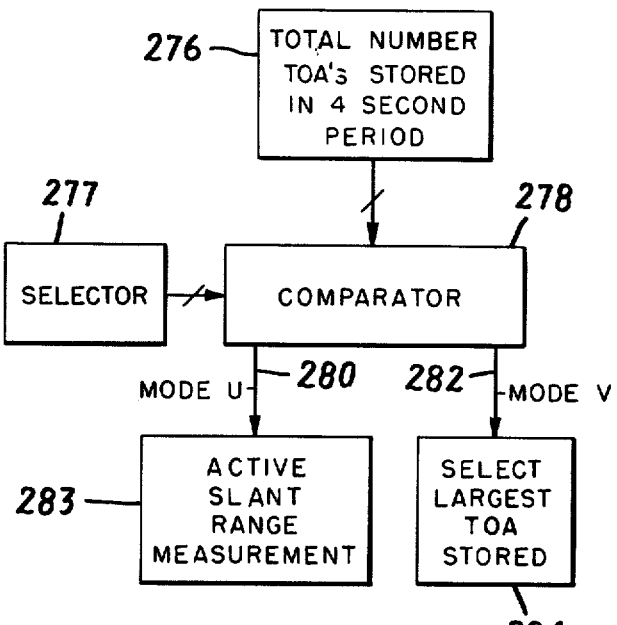
FIG. 26 is a block diagram of still another preferred embodiment of the present invention.

FIG. 26 shows a further embodiment, according to the present invention, wherein the proximity indicating system is adaptively modified in response to the quality of the passively obtained proximity indication information to either actively obtain a slant range measurement to an intruder aircraft or to select the most accurate time of arrival (TOA) of a transponder reply that has been passively obtained.

The apparatus of FIG. 26 provides that the total number of TOA's determined and stored in a 4 second period (element 276) be compared by a comparator 278 to a value or count selected by a selector 277 as being the minimum number of TOA's from which a range indication should be based. If fewer TOA's are available than the selected value, the comparator 278 produces a signal on line 280, indicating a mode U operating condition, to activate the active slant range measurement apparatus 283. Conversely, if the number of available TOA's is equal to or greater than the selected value, the comparator 278 produces a signal on line 282, indicating a mode V operation, and activates an apparatus 284 to select the largest TOA stored.

Figure 27:
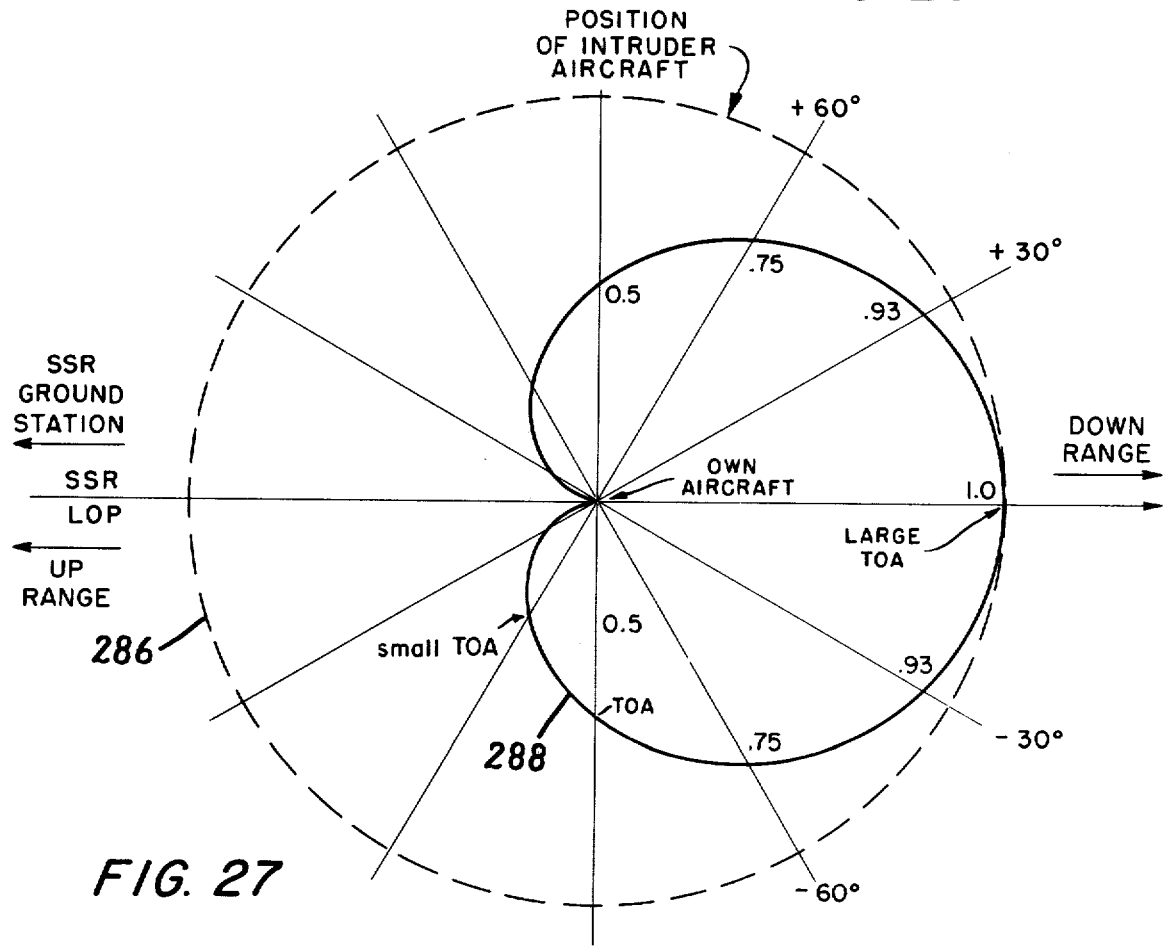
FIG. 27 is a geometrical diagram showing the locus of the times of arrival (TOA's) for an intruder aircraft in various positions around an own aircraft with respect to a given secondary surveillance radar line of position (LOP).

FIG. 27 is a geographical representation which illustrates the desirability of providing the adaptive mode alternatives per the apparatus of FIG. 26. With an SSR ground station located along the line of position (LOP) of the own aircraft as indicated in FIG. 27, the locus of TOA values, passively measured, of an intruder aircraft flying in a constant radius circle 286 about the own aircraft may be represented by the distance from the own aircraft as in the curve 288. It may be seen from this curve that the down range TOA's are the most accurate indicators of slant range. As the intruder aircraft moves in either direction on the circle 286 away from the down range LOP, the passively measured TOA values decrease until these values are no longer an accurate indication of slant range or separation. As the intruder aircraft approaches points that are 90° off the down range LOP, for example, the passively measured TOA is only one-half of the maximum TOA value.

It is desirable that the largest TOA value be selected and used to base an estimate of the separation between the own aircraft and an intruder. For a given orientation and spacing between an aircraft proximity pair, multiple SSR's will create multiple LOP's each similar to FIG. 27 but oriented in accordance with the angle of arrival of the interrogation signals. Thus, 40 geographically distributed SSR stations create 40 TOA curves whose maximum TOA value varies. Obviously, those SSR's with LOP's that lie near the orientation of the line between the proximity pair create the largest TOA values. Consequently, the largest TOA value from a multiplicity of SSR stations' interrogations provides a close approximation of range. It is important, however, to restrict the acceptance of passively measured TOA values for proximity indication purposes to situations where the own aircraft is being interrogated by more than a certain number of SSR ground stations, say, five or six. Since SSR ground stations are located to avoid duplication of coverage, such a restriction will insure that a large TOA value will be passively available from the intruder aircraft's transponder replies to at least one of the SSR ground stations.

Figure 28:
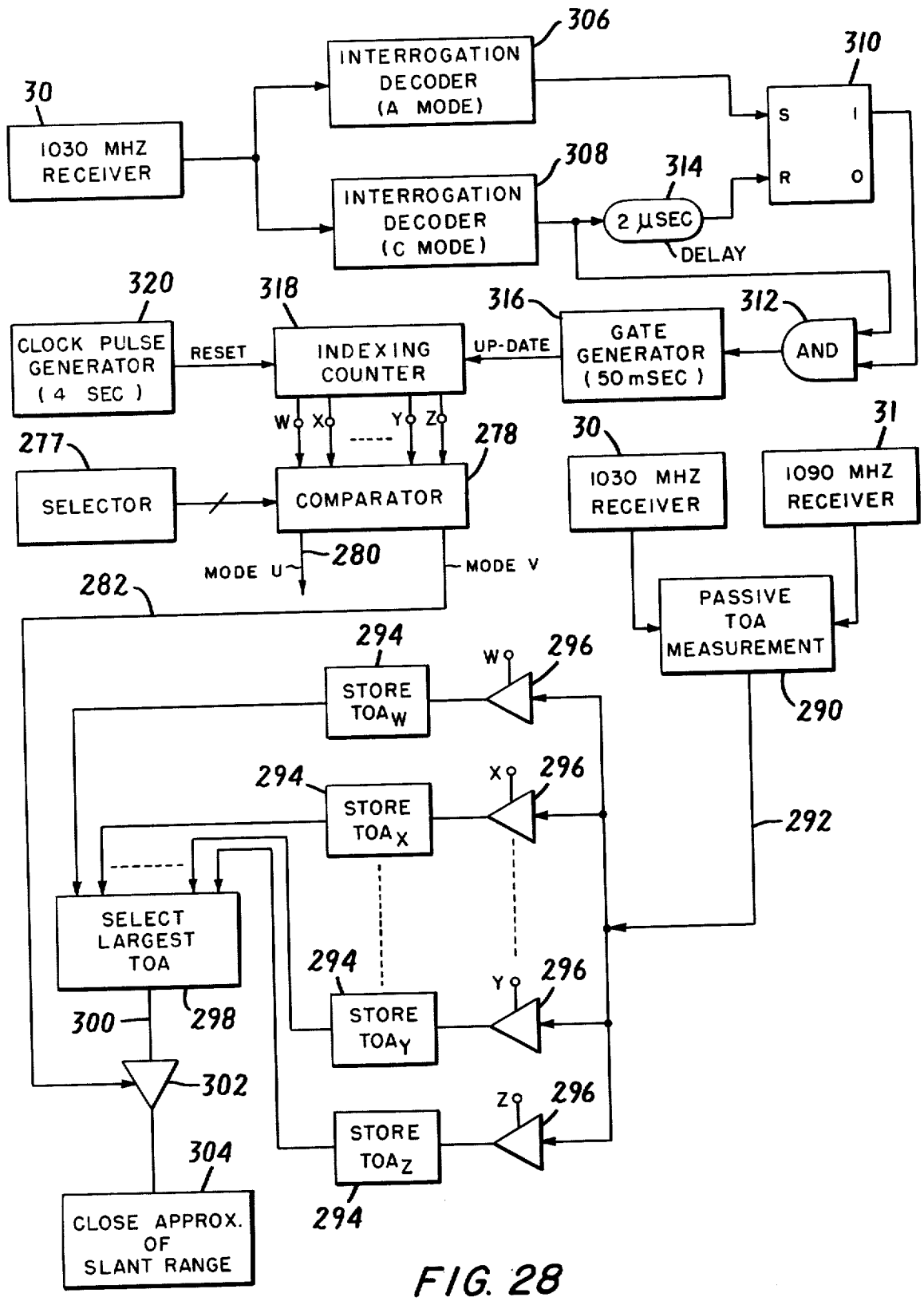
FIG. 28 is a block diagram of a TOA store and selection system which may be employed with the embodiment of FIG. 26.

FIG. 28 shows apparatus for passively determining and storing TOA values to an intruder aircraft from the intruder's replies to interrogations from a number of SSR ground stations, and for selecting the largest TOA value stored. Provided that a sufficiently large number of ground stations are interrogating the own and the intruder aircraft, this passively obtained approximation of slant range to the intruder may be used for indicating slant range and other purposes.

Accordingly, the apparatus of FIG. 28 includes a 1030 MHz receiver 30 and a 1090 MHz receiver 31 providing interrogation and intruder transponder reply information to a ramp generator and averaging element 290. This element produces an output signal on line 292 representing the average TOA value measured from a proximity aircraft's reply messages during the sweep of the own aircraft's position by each SSR ground station. As noted above, the "TOA" as used herein is defined as the time difference between receipt of an interrogation and receipt of a reply or, if the own aircraft is not within the interrogating beam, the time difference between receipt of a true or synthetic SLS signal and an "inbeam" reply. Typically 3 to 4 TOA's must agree within small limits during each beam dwell period and correlate with each other (and the PRP) in the element 290 prior to entering line 292. The apparatus of element 290 may be of a type shown and described in my copending application Ser. No. 317,810, filed Dec. 22, 1972, and referred to above.

The signal on line 292, which represents a series of TOA values, is successively gated into one of a plurality of storage elements 294 by means of a number of gate amplifiers 296 arranged in parallel. Since the gates 296 are successively activated whenever multiple SSR beams sweep the own aircraft's position during a typical rotational period of about 4 to 5 seconds, the number of TOA values that are stored is slightly less but proportional to the number of SSR ground stations which interrogate the own aircraft and its proximity partner. If a storage element 294 does not receive a signal from line 292 within a four second interval, the element simply stores a 0.

The outputs of all the storage elements 294 are supplied to a filter device 298 which passes the largest stored value to an output line 300. If a sufficient number of TOA values, say, five or six, have been determined and stored so that a signal is present on line 282 indicating mode V operation, the signal on line 300 will be gated out by a gate amplifier 302 to an indicator or other device 304 which assumes that this signal represents to a close approximation the slant range distance to an intruder aircraft.

The apparatus for successively applying gating signals to the gate amplifiers 296 is shown in the upper portion of FIG. 28. With this apparatus, if two successive SSR ground station interrogations are decoded, a gating signal is applied to the next successive gate amplifier 296 and maintained for the dwell period of the SSR beam. As may be seen, the pulses received from the 1030 MHz receiver 30 are applied to an A mode interrogation decoder 306 and a C mode interrogation decoder 308. If an A mode interrogation is decoded, a flip-flop 310 is set and a 1 signal is applied to an AND gate 312. If a C mode interrogation is decoded, a pulse is applied to the other input of the AND gate 312. After a 2 microsecond delay inserted by the delay element 314, the flip-flop 310 is reset.

If the flip-flop 310 has been set by an A mode interrogation when a C mode interrogation is received, a pulse is applied by the AND gate 312 to a gate generator 316. This gate generator then supplies a 50 millisecond pulse to a counter 318, indexing its count so that a 1 signal will appear on the next successive one of its plural outputs labelled W, X, Y, and Z. So long as an output signal is presented by the gate generator to the counter, the count will not be indexed so that, at a minimum, the count will be indexed only every 50 milliseconds. This arrangement permits the TOA values obtained during an entire beam dwell to be stored in a single one of the storage elements 294.

The counter 318 is reset to its initial count every four seconds by a clock pulse generator 320. In this way, the counter 318, in effect, counts the number of SSR beams that sweep the own aircraft within one SSR beam period of rotation. If the number of SSR beams that sweep the own aircraft is equal to or exceeds a number determined by the selector 277, the comparator 278 will produce a signal on line 282, indicating a mode V operation. On the other hand, if the beam sweeps counted by the counter 318 does not exceed the selected number, the comparator 278 will produce a signal on line 280 indicating mode U operation. As described above in connection with FIG. 26, mode U requires that the slant range be measured actively since a sufficiently exact measurement cannot be obtained entirely passively.

Figure 29:
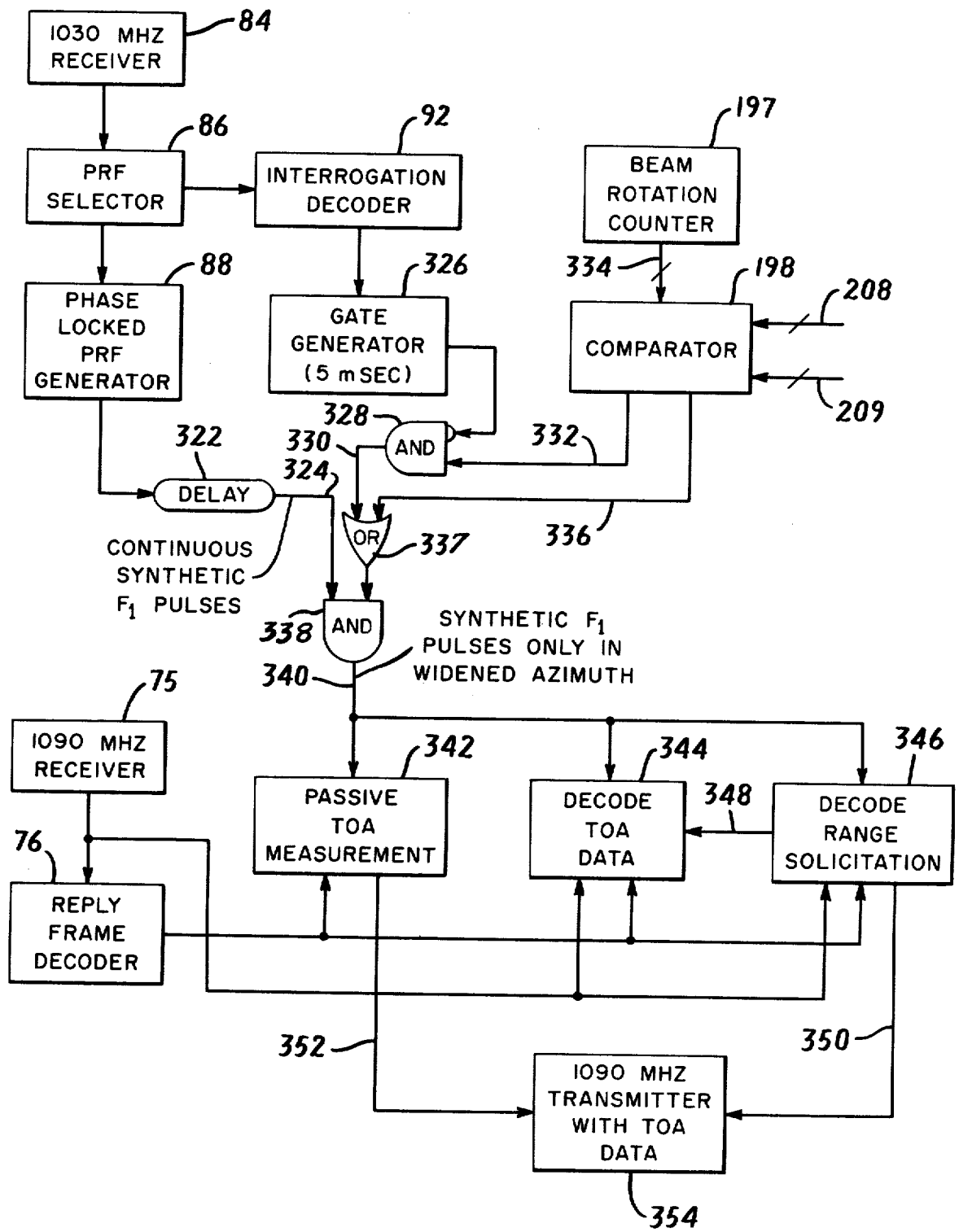
FIG. 29 is a block diagram of a modification of the control system of FIG. 15.

FIG. 29 illustrates how the apparatus of FIG. 15 may be modified to provide synchronizing pulses for the proximity measurement and the indicating system during the intervals in which the rotating main beam of an SSR ground station is directed within the selected widened azimuth sector but is not interrogating the subject aircraft. As was discussed above in connection with FIGS. 5 and 15, the phase locked PRF generator 88 continuously produces pulses at the pulse repetition frequency (PRF) and phase of the interrogations and/or side lobe suppression (SLS) signals transmitted by a selected ground station and received by the 1030 MHz receiver 84. By passing the pulses produced by the PRF generator 88 through an appropriate delay element 322, the continuous pulses may be phased with the "$F_1$" framing pulses produced and transmitted by the transponder of the subject aircraft. Since these pulses, which appear on line 324, are produced independently of the transponder circuitry which generates the true $F_1$ pulses in response to interrogations, they may be termed "synthetic $F_1$" pulses as indicated in FIG. 29.

The beam rotation counter 197 and the comparator 198 have been described above in connenction with FIG. 15. In this embodiment, the comparator 198 compares the count received on line 334 from the beam rotation counter with the two count values on lines 208 and 209, respectively. If the count appearing on line 334 is less than the digital number appearing on line 209, the comparator will continuously produce an output signal on line 332 (but not on line 336). Similarly, if the count value on line 334 is greater than the digital number appearing on line 208, the comparator will continuously produce an output signal on line 336 (but not on line 332). If the count value on line 334 lies between the digital numbers appearing on lines 209 and 208, respectively, the comparator 198 will not produce an output signal either on line 332 or 336.

Thus immediately prior to the moment when the subject aircraft is interrogated, when the leading edge of the main beam lies within the selected widened azimuth sector and is approaching the subject aircraft, a signal will be present on line 336. During the period in which the subject aircraft is interrogated — i.e., during the period of "beam dwell" — and immediately thereafter as the trailing edge of the main beam traverses away from the subject aircraft but lies within the selected widened azimuth sector, a signal will appear on line 332. This signal on line 332 is passed to and AND gate 328 which is open, except for the interval of beam dwell. In this interval, during which interrogations are decoded by the decoder 92 and a continuous signal is produced by the gate generator 326, the passage of a signal through the AND gate 328 is inhibited. Thus a signal will be present at the output of the AND gate 328 on line 330 only during the period in which the trailing edge of the main beam traverses away from the subject aircraft but lies within the selected widened azimuth sector.

The respective signals on lines 330 and 336 are passed to an OR gate 337; the output of this OR gate and the signal on line 324 are then supplied to an AND gate 338 which transmits the synthetic $F_1$ pulses on line 324 to its output on line 340 if and only if a gating signal is present on either line 330 or line 336. The synthetic $F_1$ pulses will therefore appear on line 340 only when the rotating main beam is directed within the selected widened azimuth sector but is not interrogating the subject aircraft.

The transponder replies of a possibly threatening intruder aircraft are received by the 1090 MHz receiver 75 and decoded by the reply frame decoder 76. Each decoded reply results in a pulse which is passed to a timer 342 that measures the time of arrival (TOA) of the reply with respect to the immediately preceding synthetic $F_1$ pulse on line 340. The output of the receiver 75 is also passed directly to the decoders 344 and 346 which decode the TOA and range solicitation information, respectively, that may appear in the reply messages of the intruder aircraft between the $F_1$ and $F_2$ framing pulses. A pulse from the reply frame decoder 76, indicating the existence of a decoded reply, and the synthetic $F_1$ pulses appearing on line 340 are used to initiate the decoding operations in the decoder elements 344 and 346.

If a reply message received by the 1090 MHz receiver 75 contains a range solicitation, as may be indicated, for example, by the presence of an X pulse within the message, a further enabling pulse is transmitted on line 348 to the decoder element 344 to initiate its operation. In addition, an enabling pulse is produced on line 350, and passed to the transponder 1090 MHz transmitter 354 to initiate a reply transmission. This transmitter 354 receives the measured TOA from the timer 342 on line 352 and encodes this data in its reply format for receipt and use by the range soliciting aircraft.

In operation, the apparatus of FIG. 29 provides the means for completing an air-to-air range solicitation of the type described in my copending application Ser. No. 180,578 filed Sept. 15, 1971. As there discussed, the slant range between two aircraft is measured by an exchange of 1090 MHz reply messages, permitting one aircraft to measure the two-way transmission time. In the typical case, the two-way exchange might proceed as follows:

1. Assume that the subject aircraft and a possibly threatening intruder aircraft are arranged in the relative positions indicated in FIG. 2 of my copending application Ser. No. 180,578, filed Sept. 15, 1971; that is, they are situated in such a way that the main beam of an SSR station first traverses and interrogates the subject aircraft before traversing and interrogating the intruder aircraft.

As the subject aircraft is interrogated by the main beam, its transponder replies are received at the intruder aircraft. If the subject aircraft lies within the widened azimuth sector of the proximity measurement and indicating system of the intruder aircraft, this system will compute the TOA of these replies and indicate the proximity of the two aircraft to the intruder aircraft pilot.

2. Thereafter, the proximity indicating system of the intruder aircraft may solicit a direct air-to-air exchange between the intruder aircraft and the subject aircraft for the purpose of slant range measurement. When the rotating main beam next reaches and interrogates the intruder aircraft, the proximity indicating system may encode an X pulse, as well as the TOA data measured previously, on one or more of its reply messages.

The decoder element 344 operates, in response to its various inputs, to decode the time of arrival information which is encoded in the reply messages of the intruder aircraft. This information may be displayed, as desired, or compared to the current passive TOA measurement obtained by the element 342 to check the accuracy of this measurement.

3. The subject aircraft, which carries apparatus of the type illustrated in FIG. 29, receives the reply messages transmitted by the proximity indicating system of the intruder aircraft. If an X pulse is present in a reply message, and if the intruder aircraft is within the widened azimuth sector determined by the count value on line 209 in the apparatus of FIG. 29, the range solicitation is decoded by the decoder element 346. In addition, the TOA of the intruder aircraft reply is measured by the timer 342 and the TOA data encoded in the reply message is decoded by the decoder element 344.

4. The TOA of the intruder aircraft reply is then encoded in a reply message of the subject aircraft and this message is transmitted omni-directionally by the transmitter 354.

5. When the reply message transmitted by the transmitter 354 is received by the proximity indicating system of the intruder aircraft, this system computes the two-way transmission time and, thus, the slant range between the two aircraft. In addition, the proximity indicating system of the intruder aircraft decodes the TOA data transmitted in the reply message and utilizes this data to compute the bearing of the subject aircraft.

Figure 30:
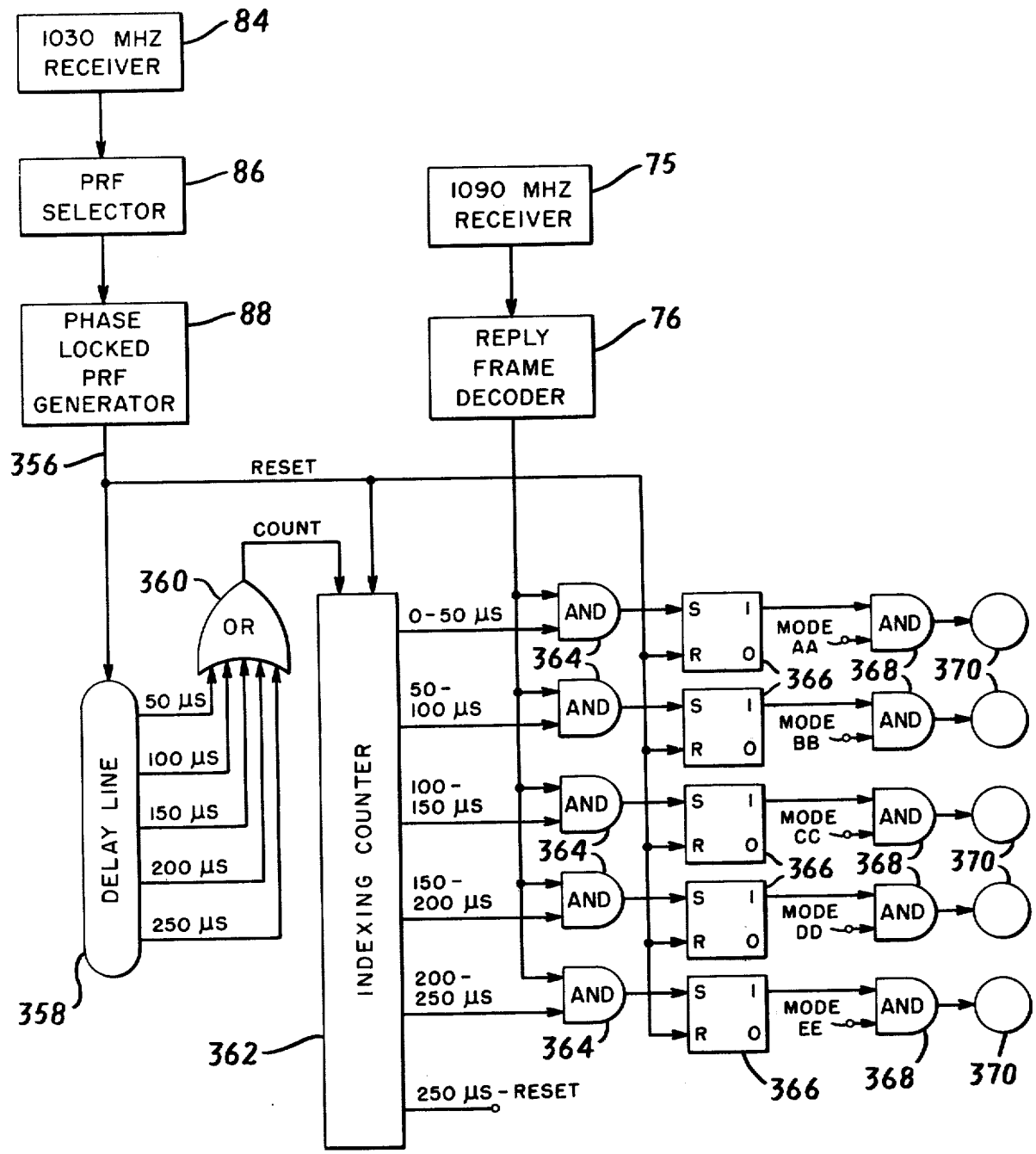
FIG. 30 is a block diagram of an alternate embodiment of the control system of FIG. 6.

FIG. 30 illustrates an alternate embodiment of the apparatus of FIG. 5 for adjusting the minimum and maximum TOA gates. In this embodiment any transpondner replies which are received, during a given interval following a pulse produced by the phase locked PRF generator 88, are stored; however, the indication of the existence of these replies is made dependent upon the mode of operation of the system.

In addition to the elements 75, 76, 84, 86 and 88, which have been described above in connection with FIG. 5, FIG. 30 shows a tapped delay line 358, and OR gate 360, an indexing counter 362, AND gates 364, flip-flops 366, AND gates 368, and indicators 370, all connected as shown. The delay line 358 is provided with a number of taps providing delays of 50 microseconds, 100 microseconds, 150 microseconds, 200 microseconds and 250 microseconds, respectively, so that a pulse appearing on line 356 will reappear at 50 microsecond intervals at the output of one of the taps and be passed through the OR gate 360 to index the counter 362 to its next state or count. The counter 362, which is reset to zero by a pulse on line 356, produces a signal at one of its six outputs during the intervals indicated, thus operating in the manner of a six-position stepping switch. The outputs of the counter are used to gate a pulse from the reply frame decoder 76, indicating the presence of a reply, to an appropriate flip-flop 366. Depending upon the mode of operation of the system, the output of each flip-flop may then be gated by an AND gate 368 to a corresponding indicator 370.

The controlling inputs to the AND gates 368, indicated as modes AA, BB, CC, DD and EE, respectively, may be supplied manually, e.g., through the use of toggle switches which permit a voltage to be applied to the respective AND gate inputs, or automatically in response to environmental changes which are reflected as different modes of operation in the manner discussed above.

In operation, each pulse produced by the phase locked PRF genenrator 88 in the apparatus of FIG. 30 resets the counter 362 and the flip-flops 366 to zero. In addition, this pulse is propagated along the delay line 358 so that pulses are passed to the OR gate 360 at 50 microsecond intervals. The counter 362, which initially produces a signal on its first output (0–50 microseconds), is caused to produce signals at successive outputs every 50 microseconds. When the counter 362 has been indexed to its last output (250 microseconds - reset), it receives no further pulses from the OR gate 360 until it is again reset by a pulse on line 356.

There are five possible modes of operation of the system illustrated, indicated in FIG. 30 as modes AA, BB, CC, DD and EE, respectively. Clearly, the inputs to various ones of the AND gates 368 can be combined so that fewer modes may be used. It is also obvious that the apparatus may be expanded to provide additional taps on the delay line 358, additional corresponding outputs of the counter 362 and additional AND gates 364, 368, flip-flops 366 and indicators 370 so that a greater number of TOA intervals may be indicated.

The indicators 370 in the apparatus of FIG. 30 permit the pilot of the subject aircraft to estimate the TOA's of the replies from intruder aircraft. For example, the indicators 370 may comprise dashboard lights of different colors with the largest TOA's being indicated by green lights and the smallest TOA's being indicated by red (and possibly flashing) lights. The passage of information from the flip-flops 366 to the lights 370 may be controlled, either manually by the pilot or automatically in accordance with the signal environment by the adaptive system according to the present invention, by providing signals at the mode inputs of the AND gates 368.

Although the preferred embodiments of the present invention have been described above with reference to the proximity indication of aircraft, numerous other applications of the present invention will occur to those skilled in the art. For example, the invention may be used to control marine traffic as well as air traffic. On the open sea, the present invention can provide ship captains with an indication of the proximity of other ships. In a harbor, the location and movement of each running ship may be displayed for a marine traffic controller.

It will also be understood that the present invention itself is susceptible to various modifications, changes and adaptations. For example, although the various embodiments of the invention have been independently described, it will be understood that these embodiments may be combined in various ways without departing from the spirit and scope of the present invention.

I claim:

1. An adaptive proximity indicating system, utilizing interrogations transmitted by standard azimuthally scanning secondary surveillance radar (SSR) stations and received by a first receiver means, and utilizing reply messages transmitted by transponders replying to such interrogations and received by a second receiver means, for monitoring the proximity of transponders in a particular region of space, said indicating system having a plurality of operating modes for adapting to the signal environment and comprising, in combination:

a. interrogation rate measuring means responsive to said first receiver means for measuring the number of interrogations received per unit of time; and b. means, responsive to said rate measuring means, for modifying the mode of operation of said indicating system in accordance with the interrogation rate.

2. The invention defined in claim 1, wherein said rate measuring means includes means for counting said interrogations for a prescribed period of time.

3. The invention defined in claim 1 wherein said rate measuring means includes means for counting said interrogations for a time substantially equal to the period of rotation of an SSR main beam.

4. The invention defined in claim 1, wherein said indicating system further comprises:
   c. indicator means adapted to be actuated in response to the output of said second receiver means;
   d. means, responsive to the output of said first receiver means, for preventing actuation of said indicator means during a predetermined first interval, said predetermined first interval being initiated at an instant determined by the time that the wavefront of an interrogation moving at radio velocity passes through an arc having a radius extending from the SSR station transmitting that interrogation to the position of said first receiver means; and
   e. means, responsive to said mode modifying means, for changing the length of said predetermined first interval in accordance with the mode of operation.

5. The invention defined in claim 4, wherein said interval length changing means includes means for increasing said length of said first interval in response to an increase in said interrogation rate and decreasing said length of said first interval in response to a decrease in said interrogation rate.

6. The invention defined in claim 1, wherein said indicating system further comprises:
   c. indicator means adapted to be actuated in response to the output of said second receiver means;
   d. means, responsive to the output of said first receiver means, for preventing actuation of said indicator means after a predetermined second interval, said predetermined second interval being initiated at an instant determined by the time that the wavefront of an interrogation moving at radio velocity passes through an arc having a radius extending from the SSR station transmitting that interrogation to the position of said first receiver means; and
   e. means, responsive to said mode modifying means, for changing the length of said predetermined second interval in accordance with the mode of operation.

7. The invention defined in claim 6, wherein said interval length changing means includes means for decreasing said length of said second interval in response to an increase in said interrogation rate and increasing said length of said second interval in response to a decrease in said interrogation rate.

8. The invention defined in claim 1, wherein said indicating system further comprises:
   c. indicator means adapted to be actuated in response to the output of said second receiver means;
   d. means, responsive to the output of said first receiver means, for preventing actuation of said indicator means during a predetermined first interval and after a predetermined second interval, said predetermined first interval and said predetermined second interval being initiated at an instant determined by the time that the wavefront of an interrogation moving at radio velocity passes through an arc having a radius extending from the SSR station transmitting that interrogation to the position of said first receiver means; and
   e. means, responsive to said mode modifying means, for changing the length of one of said predetermined first and second intervals in accordance with the mode of operation.

9. The invention defined in claim 8, wherein said interval length changing means includes means for decreasing length of said second interval in response to an increase in said interrogation rate and increasing the length of said second interval in response to a decrease in said interrogation rate.

10. The invention defined in claim 1, wherein said indicating system further comprises:
    c. indicator means adapted to be actuated in response to the output of said second receiver means;
    d. means responsive to the output of said second receiver means for decoding altitude from said reply messages;
    e. means responsive to said altitude decoding means for preventing actuation of said indicator means if the decoded altitude does not fall within a prescribed altitude range; and
    f. means responsive to said mode modifying means for changing said prescribed altitude range in accordance with the mode of operation.

11. The invention defined in claim 10, wherein said altitude range changing means includes means for decreasing the size of said altitude range in response to an increase in the said interrogation rate and increasing the size of said altitude range in response to a decrease in the said interrogation rate.

12. The invention defined in claim 1, wherein said indicating system further comprises:
    c. transmitter means, responsive to the output of said first receiver means, for transmitting a reply message to a received interrogation;
    d. means, responsive to the output of said first receiver means, for preventing the reception of reply messages by said second receiver means during the period that a reply message is transmitted; and
    e. means, responsive to said mode modifying means and connected to means (c) and means (d), for suppressing the transmission of a reply message and permitting the reception of reply messages during a prescribed period in accordance with the mode of operation.

13. The invention defined in claim 12, wherein said suppression means includes means for suppressing the transmission of a reply message for a non-synchronous period of approximately 2,500 microseconds, approximately 18 times per second.

14. The invention defined in claim 12, wherein said suppression means includes means for suppressing the transmission of a reply message for a period of approximately 100 microseconds after receipt of an interrogation, approximately 18 times per second.

15. The invention defined in claim 1, wherein said indicating system further comprises:
    c. indicator means adapted to be actuated in response to the output of said second receiver means;
    d. timing means, responsive to the output of said first receiver means, for producing a signal when the main beam of the SSR is directed within a selected azimuth sector of its full rotation; and e. means responsive to said mode modifying means for changing said selected azimuth sector in accordance with the mode of operation.

16. The invention defined in claim 1, wherein said indicating system further comprises:
   c. indicator means adapted to be actuated in response to the output of said second receiver means;
   d. timing means, responsive to the output of said first receiver means, for producing a signal when the main beam of the SSR is directed within a selected azimuth sector of its full rotation; and
   e. means responsive to said mode modifying means for increasing said selected azimuth sector when said interrogation rate is decreased and decreasing said selected azimuth sector when said interrogation rate is increased.

17. The invention defined in claim 1, wherein said indicating system further comprises:
   c. transmitter means for transmitting a signal for causing nearby transponders to transmit a reply message, said transmitter means being responsive to said mode modifying means to enable the transmission in accordance with the mode of operation; and
   d. timer means, responsive to said transmitter means and to said second receiver means, for determining the round trip transmission time to said nearby transponders.

18. The invention defined in claim 1, wherein said indicating system further comprises:
   c. transmitter means for transmitting a signal for causing nearby transponders to transmit a reply message, said transmitter means being responsive to said mode modifying means to enable repetitive transmissions when said interrogation rate falls below a prescribed value; and
   d. timer means, responsive to said transmitter means and to said second receiver means, for determining the round trip transmission time to said nearby transponders.

19. The invention defined in claim 1, wherein said indicating system further comprises:
   c. filter means, responsive to said first receiver means, for selecting interrogations having a prescribed pulse repetition frequency range; and
   d. means, responsive to said mode modifying means, for changing said prescribed frequency range thereby to increase or decrease the number of selected interrogations in accordance with the mode of operation.

20. The invention defined in claim 1, wherein said indicating system further comprises:
   c. filter means, responsive to said first receiver means, for selecting interrogations having a prescribed pulse repetition frequency range; and
   d. means, responsive to said mode modifying means, for increasing said frequency range when said interrogation rate is decreased and decreasing said frequency range when said interrogation rate is increased.

21. The invention defined in claim 1, wherein said first receiver means includes means for receiving said lobe suppression (SLS) signals with two values of gain and provides said SLS signals at a normal gain output and a high gain output;
   c. and wherein said indicating system further comprises: means coupled to said normal and high gain outputs for providing a continuous pulse train which is synchronized with said SLS signals; and
   d. means responsive to said mode modifying means for decoupling means (c) from at least one of said normal and high gain outputs;
   whereby said continuous pulse train may be utilized by said indicating system to synchronize said system with the SSR ground station transmitting said SLS signals.

22. The invention defined in claim 21, wherein said two values of gain of said first receiver means are approximately 72-dbm and 85-dbm.

23. An adaptive proximity indicating system utilizing interrogations transmitted by standard azimuthally scanning secondary surveillance radar (SSR) stations and received by a first receiver means, and utilizing reply messages transmitted by transponders replying to such interrogations and received by a second receiver means, for monitoring the proximity of transponders in a particular region of space, said indicating system having a plurality of operating modes for adapting to the signal environment and comprising, in combination:
   a. reply rate measuring means responsive to said second receiver means for measuring the number of reply messages received per unit of time; and
   b. means, responsive to said rate measuring means, for modifying the mode of operation of said indicating system in accordance with the reply rate.

24. An adaptive proximity indicating system, utilizing interrogations transmitted by standard secondary surveillance radar (SSR) stations and reply messages transmitted by transponders replying to such interrogations, for monitoring the proximity of transponders in a particular region of space, said indicating system having a plurality of operating modes for adapting to the signal environmennt and comprising, in combination:
   a. first receiver means for receiving said interrogations;
   b. second receiver means for receiving said reply messages;
   c. first rate measuring means responsive to said first receiver means for measuring the number of interrogations received per unit of time;
   d. second rate measuring means responsive to said second receiver means for measuring the number of reply messages received per unit of time;
   e. means responsive to said first rate measuring means for modifying the mode of operation of said indicating system in accordance with the interrogation rate; and
   f. means responsive to said second rate measuring means for modifying the mode of operation of said indicating system in accordance with the reply rate.

25. An adaptive proximity indicating system for use in an aircraft, utilizing interrogations transmitted by standard azimuthally scanning secondary surveillance radar (SSR) stations and received by a first receiver means, and utilizing reply messages transmitted by transponders replying to such interrogations and received by a second receiver means, for monitoring the proximity of transponders in a particular region of space, said indicating system having a plurality of operating modes for adapting to the signal environment and comprising, in combination:
   a. means for measuring the altitude of the aircraft; and b. means, responsive to said altitude measuring means, for modifying the mode of operation of said indicating system in accordance with the altitude.

26. An adaptive proximity indicating system, utilizing interrogations and side lobe suppression (SLS) signals transmitted by standard azimuthally scanning secondary surveillance radar (SSR) stations and received by a first receiver means, and utilizing reply messages transmitted by transponders replying to such interrogations and received by a second receiver means, for monitoring the proximity of transponders in a particular region of space, said indicating system having a plurality of operating modes for adapting to the signal environment and comprising, in combination:
 a. means responsive to said first receiver means for decoding said SLS signals; and
 b. means, responsive to said decoding means, for modifying the mode of operation of said indicating system in accordance with the strength of said SLS signals.

27. An adaptive proximity indicating system, utilizing interrogations transmitted by standard azimuthally scanning secondary surveillance radar (SSR) stations and reply messages transmitted by transponders replying to such interrogations, for monitoring the proximity of transponders in a particular region of space, said indicating system having a plurality of operating modes for adapting to the signal environment and comprising, in combination:
 a. first receiver means for receiving said interrogations;
 b. second receiver means for receiving said reply messages;
 c. means, responsive to said first and second receiver means, for determining the time of arrival (TOA) of each reply message of a given transponder initiated by an interrogation from each SSR station received, said TOA's being measured relative to an instant determined by the time that the wavefront of an interrogation moving at radio velocity passes through an arc having a radius extending from the SSR station transmitting that interrogation to the position of said first receiver means;
 d. means for measuring the rate of determination of the TOA's for said given transponder; and
 e. means, responsive to said rate measuring means, for modifying the mode of operation of said indicating system in accordance with said rate.

28. The invention defined in claim 27, wherein said rate measuring means includes means for counting the number of times a rotating main beam of an SSR station is received during a prescribed period of time.

29. The invention defined in claim 27, wherein said rate measuring means includes means for counting said TOA's determined for a time substantially equal to the period of rotation of an SSR main beam.

30. The invention defined in claim 27, wherein said indicating system further comprises:
 f. means for transmitting a signal for causing nearby transponders to transmit a reply message, said transmitter means being responsive to said mode modifying means to enable the transmission in accordance with the mode of operation; and
 g. timer means, responsive to said transmitter means and to said second receiver means, for determining the round trip transmission time to nearby transponders.

31. The invention defined in claim 27, wherein said indicating system further comprises:
 f. means for transmitting a signal for causing nearby transponders to transmit a reply message, said transmitter means being responsive to said mode modifying means to enable repetitive transmissions when said rate falls below a prescribed value; and
 g. timer means, responsive to said transmitter means and to said second receiver means, for determining the round trip transmission time to nearby transponders.

32. The invention defined in claim 27, wherein said indicating system further comprises:
 f. means, responsive to said TOA-determining means, for storing a plurality of TOA's;
 g. means, responsiive to said storage means, for selecting the largest TOA that is stored; and
 h. means, responsive to said mode modifying means and to said selecting means, for producing a signal representing the largest TOA in accordance with the mode of operation.

33. The invention defined in claim 27, wherein said indicating system further comprises:
 f. means, responsive to said TOA-determining means, for storing a plurality of successive TOA's determined for a given transponder in a prescribed period of time;
 g. means, responsive to said storage means, for selecting the largest TOA that is stored; and
 h. means, responsive to said mode modifying means and to said selecting means, for producing a signal representing the largest TOA in accordance with the mode of operation.

34. The invention defined in claim 27, wherein said indicating system further comprises:
 f. means, responsive to said TOA-determining means, for storing a plurality of successive TOA's determined for a given transponder during a period time substantially equal to the period of rotation of an SSR main beam;
 g. means, responsive to said storage means, for selecting the largest TOA that is stored; and
 h. means, responsive to said mode modifying means and to said selecting means, for producing a signal representing the largest TOA in accordance with the mode of operation.

35. The invention defined in claim 27, wherein said indicating system further comprises:
 f. means, responsive to said TOA-determining means, for storing a plurality of successive TOA's determined for a given transponder in a prescribed period of time;
 g. means, responsive to said storage means, for selecting the largest TOA that is stored; and
 h. means, responsive to said mode modifying means and to said selecting means, for producing a signal representing the largest TOA in accordance with the mode of operation, if the number of TOA's stored in said storage means for said prescribed period of time exceeds a given value.

36. A common azimuthal sector proximity indicating system, utilizing interrogationsn transmitted by a standard azimuthally scanning secondary surveillance radar (SSR) station and reply messages transmitted by a transponder replying to such interrogations, for monitoring the proximity of transponders in an azimuth sector wider than the rotating main beam of the radar, comprising:
  a. first receiver means for receiving said interrogations during the passage of the rotating main beam,
  b. second receiver means for receiving said reply messages transmitted by said transponder as it is interrogated by the rotating main beam,
  c. timing means, responsive to said first receiver means, for producing a control signal when the rotating main beam is directed within a selected azimuth sector of its full rotation, said timing means including:
    1. a clock pulse generator;
    2. counter means, responsive to said generator, for accumulating the clock pulses produced by said generator; and
    3. comparator means, responsive to said counter means, for comparing the count in said counter means with a reference count range and producing said control signal when the count in the counter means lies within said reference count range; and
  d. means, responsive to said second receiver means and to said control signal, for producing a common azimuth sector indicating signal,
  whereby the existence of a replying transponder is indicated if such transponder is located within said common azimuth sector.

37. The invention set forth in claim 36, wherein said generator includes a phase locked oscillator which operates synchronously with the pulse repetition frequency of said interrogations.

38. The invention set forth in claim 37, further comprising timer means, responsive to said generator, to said second receiver means and to said comparator means, for determining the time of arrival (TOA) of reply messages transmitted by said transponder when said control signal is present, said TOA's being measured relative to the clock pulses produced by said generator.

39. The invention defined in claim 37, further comprising
  e. decoder means, responsive to said generator, to said second receiver means and to said comparator means, for decoding a reply solicitation encoded in reply messages transmitted by said transponder when said control signal is present; and
  f. transmitter means responsive to said decoder means for transmitting a range reply signal when a reply solicitation has been decoded.

40. The invention defined in claim 39, wherein said timing means further includes means for selecting said reference count range such that said control signal is produced by said comparator means for a period immediately prior to the arrival of the leading edge of the rotating main beam.

41. The invention defined in claim 39, wherein said timing means further includes means for selecting said reference count range such that said control signal is produced by said comparator means for a period immediately after the passage of the trailing edge of the rotating main beam.

42. The invention set forth in claim 36, wherein said timing means further includes means for resetting said counter means once during each revolution of said main beam.

43. A proximity indicating system utilizing interrogations transmitted by standard azimuthally scanning secondary surveillance radar (SSR) stations and reply messages transmitted by transponders replying to such interrogations, for monitoring the proximity of transponders in a particular region of space, said indicating system comprising in combination:
  a. first receiver means for receiving said interrogations;
  b. second receiver means for receiving said reply messages;
  c. a plurality of storage means;
  d. gating means, responsive to the output of said second receiver means, for selectively coupling the output of said second receiver means to one of said storage means;
  e. gate actuating means, responsive to the output of said first receiver means, for causing said gating means to couple the output of said second receiver means to successive ones of said storage means at successive predetermined intervals, said predetermined intervals being initiated at an instant determined by the time that the wavefront of an interrogation moving at radio velocity passes through an arc having a radius extending from the SSR station transmitting that interrogation to the position of said first receiver means;
  f. indicator means; and
  g. means for coupling the output of at least one of said storage means to said indicator means.

44. The proximity indicating system defined in claim 43, further comprising:
  h. interrogation rate measuring means responsive to said first receiver means for measuring the number of interrogations received per unit of time;
  wherein means (g) includes means, responsive to said interrogation rate measuring means, for changing the outputs of said storage means which are coupled to said indicator means in accordance with the interrogation rate.

45. The proximity indicating system defined in claim 43, further comprising:
  h. reply rate measuring means responsive to said second receiver means for measuring the number of reply messages received per unit of time;
  wherein means (g) includes means, responsive to said reply rate measuring means, for changing the outputs of said storage means which are coupled to said indicator means in accordance with the reply rate.

46. The proximity indicating system defined in claim 43, wherein means (g) includes manually operable gating means for changing the outputs of said storage means which are coupled to said indicator means.

* * * * *